United States Patent
Selim

(10) Patent No.: US 9,588,668 B2
(45) Date of Patent: Mar. 7, 2017

(54) METHODS OF DISPLAYING A SECOND VIEW

(75) Inventor: Mo Selim, Oakville (CA)

(73) Assignee: Imerj, LLC, Broomfield, CO (US)

( * ) Notice: Subject to any disclaimer, the term of this patent is extended or adjusted under 35 U.S.C. 154(b) by 402 days.

(21) Appl. No.: 13/188,331

(22) Filed: Jul. 21, 2011

(65) Prior Publication Data

US 2013/0021266 A1   Jan. 24, 2013

(51) Int. Cl.
*G06F 3/041* (2006.01)
*G06F 3/0487* (2013.01)
*G06F 3/0488* (2013.01)

(52) U.S. Cl.
CPC ........ *G06F 3/0487* (2013.01); *G06F 3/04883* (2013.01); *G06F 2203/04803* (2013.01); *G06F 2203/04806* (2013.01)

(58) Field of Classification Search
CPC .... G06F 3/1415; G06F 3/1423; G06F 3/1454; G06F 3/1446; G06F 3/1462; G06F 3/041; G06F 1/1624; G06F 1/1626; H04N 7/147; H04N 7/152; H04N 2007/145
USPC .................................................... 345/2.2, 2.3
See application file for complete search history.

(56) References Cited

U.S. PATENT DOCUMENTS

| | | |
|---|---|---|
| 5,356,156 A | 10/1994 | Suzuki et al. |
| 5,841,078 A | 11/1998 | Miller et al. |
| 6,154,194 A | 11/2000 | Singh |
| 6,222,538 B1 | 4/2001 | Anderson |
| 7,551,899 B1 | 6/2009 | Nicolas et al. |
| 8,686,959 B2 | 4/2014 | Payne |
| 2003/0237043 A1 | 12/2003 | Novak et al. |
| 2004/0025112 A1 | 2/2004 | Chasen et al. |
| 2004/0152513 A1 | 8/2004 | Shimizu |
| 2006/0101354 A1* | 5/2006 | Hashimoto et al. .......... 715/863 |
| 2006/0197753 A1 | 9/2006 | Hotelling |
| 2007/0063923 A1* | 3/2007 | Koenig .......................... 345/1.1 |

(Continued)

OTHER PUBLICATIONS

"Tested: Five Game Console Emulators on Android", written by Ryan Whitwam, published on Apr. 1, 2011 and accessible via URL<http://www.tested.com/tech/gaming/2102-tested-five-game-console-emulators-on-android/>, 19 pages.

(Continued)

*Primary Examiner* — Dwayne Bost
*Assistant Examiner* — Robert Michaud
(74) *Attorney, Agent, or Firm* — Haverstock & Owens LLP

(57) ABSTRACT

Methods of displaying information on an electronic device have a first touchscreen display and a second touchscreen display are disclosed. As the user enters inputs on the first touchscreen display, the second touchscreen displays the results of the user's inputs on the first touchscreen display. Either touchscreen can be used as an input device. Display information generated by an application can be the same on both displays. Alternatively, the first and second displays comprise a single, larger screen. An single application can address the displays as distinct devices. A touchscreen display can be dedicated to a single application, or a single instance of an application such that the two displays can run different applications, or different instances of the same application. In conjunction with a wireless communications module, the electronic device can be used as a portable teleconferencing device.

16 Claims, 18 Drawing Sheets

(56) References Cited

U.S. PATENT DOCUMENTS

| | | | |
|---|---|---|---|
| 2007/0268264 A1* | 11/2007 | Aarras et al. | 345/173 |
| 2007/0279482 A1* | 12/2007 | Oswald | H04N 7/142 348/14.02 |
| 2008/0068446 A1* | 3/2008 | Barkley | H04N 7/147 348/14.07 |
| 2008/0165144 A1 | 7/2008 | Forstall et al. | |
| 2008/0207273 A1 | 8/2008 | Huo | |
| 2008/0268901 A1 | 10/2008 | Miramontes | |
| 2008/0279480 A1* | 11/2008 | Inamoto | G06F 3/0481 382/305 |
| 2008/0288878 A1 | 11/2008 | Hayashi et al. | |
| 2009/0227369 A1 | 9/2009 | Higbie et al. | |
| 2010/0033629 A1* | 2/2010 | Utz et al. | 348/553 |
| 2010/0048271 A1 | 2/2010 | Champagne et al. | |
| 2010/0064536 A1* | 3/2010 | Caskey et al. | 33/303 |
| 2010/0180297 A1* | 7/2010 | Levine et al. | 725/38 |
| 2010/0182265 A1 | 7/2010 | Kim et al. | |
| 2010/0304793 A1 | 12/2010 | Kim et al. | |
| 2011/0009195 A1 | 1/2011 | Porwal | |
| 2011/0035691 A1* | 2/2011 | Kim | 715/765 |
| 2011/0047459 A1 | 2/2011 | Van Der Westhuizen | |
| 2011/0143769 A1* | 6/2011 | Jones | G06F 1/1624 455/456.1 |
| 2011/0199361 A1 | 8/2011 | Shin | |
| 2011/0285636 A1 | 11/2011 | Howard et al. | |
| 2011/0298726 A1* | 12/2011 | Wu et al. | 345/173 |
| 2012/0038679 A1* | 2/2012 | Yun | G06F 3/1454 345/667 |
| 2012/0117506 A1 | 5/2012 | Koch et al. | |
| 2012/0242590 A1 | 9/2012 | Baccichet et al. | |
| 2013/0203495 A1 | 8/2013 | Yeh | |
| 2014/0004946 A1 | 1/2014 | Champagne et al. | |

OTHER PUBLICATIONS

"A Guide to iOS Twin Stick Shooter Usability", written by Graham McAllister, published on Apr. 5, 2011 and accessible via URL<https://web.archive.org/web.archive.org/web/20110405152128/http://www.gamasutra.com/view/feature/6323/a_guide_to_ios_twin_stick_shooter_php?print=1> 17 pages.

"Windows Game Mobile Development" authored by Adam Dawes, published on or before Dec. 31, 2010, pp. 182-184.

"Nds4droid. Un emulatore di Nintendo DS per Android" written by Fabio Parri, published Apr. 12, 2011, and accessible via URL <http://www.mobileblog./it/post/15694/nds4droid-un-emulatore-di-nintendo-ds-per-android>, 5 pages.

"Multi-touch game controller in JavaScript/HTML5 for iPad" written by Seb Lee-Delisle, published on Apr. 15, 2011 and accessible via URL<http://seb.ly2011/04/multi-touch-game-cpntroller-in-javascripthtml5-for-ipad/>, 7 pages.

"Return of Allard", written by Jeff Gerstmann, published on Sep. 22, 2009, and accessible via URL <http://www.giantbomb.com/articles/return-of-allard/1100-1693/>, 14 pages.

The first Office Action dated Apr. 25, 2016, Title of the Invention "Methods of Displaying a Second View", Chinese Patent Application No. 2012101932305, 14 pages.

Non-Final Office Action dated Jun. 17, 2016, U.S. Appl. No. 13/188,290, filed Jul. 21, 2011, Applicant: Mo Selim, Art Unit: 2699, 26 pages.

* cited by examiner

METHODS OF DISPLAYING A SECOND VIEW

FIELD OF THE INVENTION

The present invention relates to the field of electronic devices having a touchscreen. More specifically, the present invention relates to using a touchscreen interface for an electronic device without obstructing the view of the touchscreen display. The invention further relates to controlling a second display using a first touchscreen display and using the second display to show the user a more detailed view of information displayed on the first touchscreen display.

BACKGROUND OF THE INVENTION

A touchscreen comprises two distinct elements and functions: a display for displaying information and an input that is activated by touching the display. By incorporating a touchscreen into an electronic device, the electronic device can be made smaller and, often, less expensive by minimizing the number and size of other user inputs on the electronic device. In the recent past, touchscreen prices have dropped sufficiently that a touchscreen can cost-effectively be included in a wide variety of electronic devices having an even wider variety of applications. Electronic devices that comprise a touchscreen interface can include a desktop computer, a tablet computer, a laptop computer, a netbook, a personal digital assistant, a mobile phone, a Smart Phone, a digital camera, a digital music player, a digital camcorder, a digital picture frame, an electronic book reader (e-book), a bank automated teller machine (ATM), an automated retail self-checkout system, and retail checkout system for using a debit or credit card. These are but a few of the many electronic devices and applications for a touchscreen interface.

In normal use, the viewable area of a touchscreen is obscured by a user's hand as the user makes an input on the touchscreen with her hand. For example, the Apple® iPad® and Apple® iPhone® feature a touchscreen input method where a user touches the screen with two fingers, simultaneously, and draws his fingers closer together or spreads them farther apart to zoom out and zoom in, respectively, to a view of a picture on the touchscreen display. Another touchscreen input method is the user making a swiping motion with a finger across the surface of the touchscreen in order to move the displayed information laterally on the touchscreen. Other touchscreen user inputs include touching, tapping, or double tapping an icon displayed on the touchscreen display to select or activate the icon, including an icon representing a key of a keyboard, and sliding a fingertip continuously across the touchscreen to scroll the display in the direction of the fingertip motion. When a user makes any of these touchscreen inputs, the user's hand obstructs the user's view of the touchscreen display area.

A user can have an unobstructed view of a touchscreen display by using another input device, other than the touchscreen, such as a mouse, a trackball, a touchpad, a keyboard, a stylus pen, or a motion tracking device such as the Microsoft® Kinect®. Each of these solutions requires that the electronic device have hardware additional to the touchscreen. For modern portable electronic devices, an external mouse, a keyboard, or a trackball is not practical because the user must carry this extra hardware, connect it before it can be used, and the user must use the portable electronic device in a location conducive to the hardware, such as a flat surface. Further, a keyboard lacks the input flexibility offered by a touchscreen and is slow and cumbersome to use as compared to a touchscreen. A trackball offers fixed, poor resolution and cannot support multi-touch input gestures such as those described above for a touchscreen. A motion tracking device requires extensive additional hardware and software, and currently is unable to detect finger-level gesture tracking with acceptable accuracy. A stylus pen offers a single point of interaction and cannot support multi-touch input gestures. Further, the stylus pen is small and easily lost or misplaced. The stylus pen also does not solve the problem that the input device, a stylus pen or the user's fingers, obstructs the view of the touchscreen display when the user makes an input on the touchscreen.

Currently, user input on portable electronic devices is often entered using a touchscreen display. Performing user input with a touchscreen display obscures the user's view of the display unless he moves his hand away from the display with each user input. It is inconvenient to relocate one's hand at each user input to see the display screen, and it is further inconvenient to obscure the vision of the display by further user input.

SUMMARY OF THE INVENTION

Embodiments of the presently-claimed invention are directed to electronic devices for and methods of displaying information on an electronic device having a first touchscreen display and a second display. Preferably, the second display is also a touchscreen display. An application running on the electronic device can display the same thing on both displays, or utilize the displays as separate displays. In some embodiments, the two displays are used to create a single, larger screen for viewing a movie. The two touchscreens can be used to create a single, larger input area and a single, larger display area so that a single application, such as a spreadsheet, can utilize a larger screen and input area. In another example, one display shows an email inbox, and the other display shows the content of a message selected by the user from the inbox in the first display. In a modern, multitasking operating environment such as Microsoft® Windows® or Google® Chrome®, one touchscreen can be dedicated to one application, and the second touchscreen can be dedicated to a different application, or a second instance of the same application. For example, the first application is a cell phone application and the second application is a web browser.

In a first aspect, an electronic device comprises a communications module, a first display having a touchscreen, and a second display communicatively coupled to the first display. In a preferred embodiment, the first and second displays have substantially the same display screen resolution and substantially the same physical dimensions. In a preferred embodiment, the communications module in the electronic device is a wireless communications module. Examples of electronic devices include, but are not limited to, a cell phone, a SmartPhone, a personal digital assistant, a tablet personal computer, a netbook, and a laptop personal computer. Preferably, the electronic device comprises a first device portion housing the first touchscreen display, and a second device portion housing the second display. In a preferred embodiment, the two device portions each further include a camera module that is interfaced to the communications module. The two device portions can further be physically coupled together. In a preferred embodiment, the two devices portions are physically coupled together via a hinge. The two device portions can also be physically, separably coupled. In a first position, the first touchscreen display and the second display are oriented in a substantially planar relationship to each other, and are physically substantially adjacent to each other such that the physical appearance of the two displays is that of a single, larger display substantially equal in size to the combination of the two displays. In some embodiments, the electronic device includes a switch, sensor, or other detection means to automatically detect that the electronic device is in the first position. A switch, sensor, or other detection means can also detect that the two device portions are coupled. In a second position, the electronic device is in a folded, closed position such that the two device portions are back-to-back such that the two display screens are on the outside of the closed device. The electronic device can further include a switch, sensor or other detection means to detect that the electronic device is in the second position. The electronic device can further be put into a third position, between the first and second positions, such that it is partially opened, similar to the appearance of a partially-opened greeting card. In a preferred embodiment, each of the two device portions includes a retractable stand for supporting the device portion independently when the device portions are separated, or together when the device portions are physically coupled.

In a second aspect, a method of displaying first display information on an electronic device having a first touchscreen display and a second touchscreen display, comprises displaying at least a portion of the first display information on the first touchscreen display and displaying at least a portion of the first display information on the second touchscreen display. Preferably, the at least a portion of the first display information displayed on the first touchscreen display is substantially identical to the at least a portion of the first display information displayed on the second touchscreen display. In some embodiments, the at least a portion of the first display information displayed on the first touchscreen display is substantially all of the first display information. The method can further comprise receiving a user input on the first touchscreen display, automatically generating second display information in response to the user input, and displaying the second display information on the second touchscreen display. The second display information is preferably also displayed on the first touchscreen. In some embodiments, the method further comprises receiving a user input on the second touchscreen display, automatically generating third display information in response to the user input, and displaying the third display information on the first touchscreen display. The first display information can be an inbox of an email application with the user input being the selection of an email message to view, and the second display information is a detailed view of the selected message. The first display information can alternatively be a directory displaying information representing a plurality of pictures, the user input is the selection of one of the pictures for display, and the second display information is a display of the selected one of the pictures. The method can further comprise receiving user input on the second touchscreen display. The user input is an input to expand the size of the picture. The method further comprises automatically generating third display information in response to the user input and displaying the third display information on the first touchscreen display. The third display information is an expanded version picture according to the user input. During the user input, an outline of a frame indicating the amount of expansion of the size of the picture is displayed on the first touchscreen display, and the third display information is displayed on the first display without the outline of a frame after the user input is completed.

In third aspect, a method of displaying information on the electronic device described above comprises generating display information by an application on the electronic device, displaying at least a portion of the display information on the first touchscreen display and displaying at least a portion of the display information on the second display. In some embodiments, both displays show substantially the same display information such that the displays each appear to display substantially all of the display information. In other embodiments, the portion of the display information displayed on the first touchscreen is substantially one half of the display information, and the display information on the second display is substantially the other half of the display information, such that the combination of the first touchscreen display and the second display appears as a single, larger display screen.

In a fourth aspect, a method of displaying information on an electronic device having a first touchscreen display and a second display comprises displaying first display information on the first touchscreen display, receiving a user input on the first touchscreen display, automatically generating second display information in response to the user input, and displaying the second display information on the second display. In embodiments where the second display is a touchscreen display, the method further comprises receiving a user input on the second touchscreen display, automatically generating third display information in response to the user input, and displaying the third display information on the first touchscreen display. In some embodiments, the method further comprises displaying the third display information on the second touchscreen display so that both the first and second touchscreen displays are displaying substantially the same infatuation.

In a fifth aspect, a method of displaying information on an electronic device, the electronic device comprising a first touchscreen display, a second display, and a plurality of applications loaded onto the electronic device, the method comprises displaying first display information generated by a first application on the first touchscreen display, and displaying second display information generated by a second application on the second display. In a preferred embodiment, the first application is a cell phone application, and the second application is a web browser application.

In a sixth aspect, a method of displaying information is implemented on an electronic device comprising a first device portion having a first touchscreen display, a first camera module, a wireless communications module, an executing software application, and a second device portion having a second display and a second camera module. The first device portion and the second device portion can be physically, separably, and communicatively coupled. The method of displaying information on the electronic device comprises generating, by the electronic device application, first video information and second video information, displaying the first video information on the first touchscreen display, and displaying the second video information on the second display. Generating first information and second video information by the electronic device application can include receiving a video input stream comprising the first video information and the second video information, and separating the video input stream into the first video information and the second video information. In some embodiments, the video input stream comprises a plurality of video camera streams, such as a teleconference video stream or a plurality of security cameras.

In another aspect, a method of displaying information an electronic device having a first touchscreen display, a wireless communications module, and a second touchscreen display, the method comprises generating first video information and second video information from a video stream comprising the first video information and the second video information, displaying the first video information on the first touchscreen display, and displaying the second video information on the second touchscreen display. In some embodiments, the video input stream comprises a plurality of video camera streams, such as a pair of conference call video cameras or a pair of video security cameras.

The invention further comprises a control circuit implementing any of the above methods. The control circuit can comprise a first touchscreen interface and a second touch screen interface. The control circuit can further accept a video stream comprising multiple video streams, and separate out each video stream for display on a touchscreen display. The control circuit is preferably an integrated circuit. In some embodiments, the control circuit comprises a processor and a memory. The memory is programmed with the instructions necessary to implement the method steps described above.

DETAILED DESCRIPTION OF THE DRAWINGS

Figure 1A:
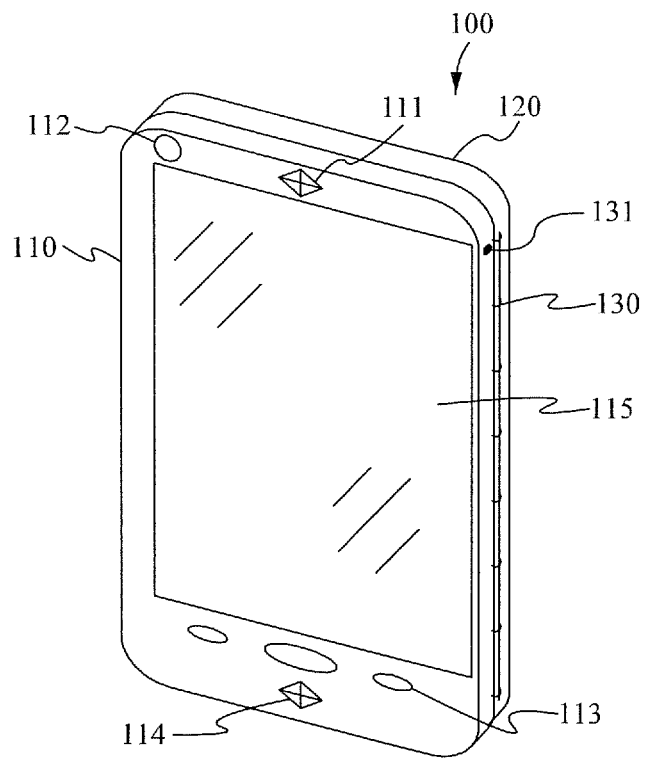
FIGS. 1A-1D show an electronic device having two displays in a closed position, a partially open position, a fully open position, and a rear view of a fully open position, respectively, according to some embodiments.

The following figures illustrate features of specific embodiments of the presently-claimed invention. Throughout the figures, below, identical labels refer to identical or similar elements. The following embodiments are intended to illustrate the features of the presently-claimed invention. The invention is not limited to only the disclosed embodiments.

The displays of the electronic device are configurable to operate in a variety of display modes, described below. The electronic device comprises a first and second device portion that, in some embodiments, are separably, hingedly, detachably coupled together. Means for detecting the relative position of the device portions, with respect to each other, are also described below. The element numbers referred to in the following description of the display modes are found in FIGS. 1A-1D, described below.

Description of Display Modes

Paired Mode

The default mode of displaying information on an electronic device 100 having two touchscreen displays ("displays") by an application running on the electronic device 100 is to display the same information on both displays. The application generates a display information and the display information is sent to both displays.

Detail Mode

In Detail Mode, the application has already generated first display information that is already shown on at least one of the first touchscreen display 115 and the second display 125. In some embodiments the second display 125 is also a touchscreen. A user input is received on one of the touchscreens. The application processes the input and generates second display information in response to the input. The following examples illustrate the operation of Detail Mode.

In an email application, the first display information can be a list of contacts in an address book. The user taps a first touchscreen display 115 to select one contact from the list of contacts, and the application generates second display information comprising a detailed view of the contact information for the selected contact. The second display information is displayed on the touchscreen display 125 that is not the one which received the user input. The display that received the user input can show an indication of the user's selection of a contact, but is otherwise unchanged.

In a music player application, the first touchscreen 115 can display a library of music by artist, genre, or year, for example. The user selects an artist to view by tapping the artist name in the library on the first touchscreen display 115. The application then generates a detailed view of the songs by the artist that are stored on the music player and displays it on the second display 125. In an embodiment where the second display 125 is a touchscreen display, the user can select a song to be played by tapping on the title of the song in the second display 125. The application receives the user input, queues the song for playing, and generates new display information showing the music player controls with the song queued for play. The new display information is displayed on the first touchscreen 115 where the user can then operate the music player controls.

In a picture viewing application, the first touchscreen display 115 can display a picture. The user can make a zoom or shrink gesture, for example, on the first touchscreen display 115. As the user moves her fingers in the spreading or narrowing diagonal finger movement as known in the art, a zoom command frame is generated and displayed on the first touchscreen display 115. When the user completes the zoom-in or zoom-out gesture, the application receives the input and generates new display information responsive to the zoom-in or zoom-out command. The new display information is displayed on the second display 125. In this way, the user can view the zoom-in or zoom-out result without moving her hand away from the first touchscreen display 115.

Full Screen Mode

In Full Screen Mode, an application treats the combination of the first touchscreen display 115 and the second display 125 as though it were a single, larger display. The application maps a portion of the display information to be displayed, for example an upper half, to the first touchscreen display 115, and maps the remainder of the display information to the second display 125. In embodiments where the second display 125 is a touchscreen display, an application can address both of the touchscreen displays as a single, larger screen with a single, larger touchscreen surface. Upon receiving an input, the application processes the user input as if the combined touchscreen surfaces are a single touchscreen pad, and generates new display information as is well-known in the art. The following examples illustrate the operation of Full Screen Mode.

In a movie player application, when the electronic device 100 is in the closed position, the movie can be played in Paired Mode, on both display screens 115 and 125. When the electronic device 100 is in the open position, as detected by the position detection switch 131, the movie player application can utilize the combined display surface of the first touchscreen display 115 and the second display 125 as a single, larger display screen for the movie. As is known in the art, the aspect ratio of the resulting images may be adjusted to the user's preference.

Multiplexed Mode and Paired Multiplexed Mode

It is possible for the electronic device 100 to receive a multiplexed video stream for display on the two touchscreen displays, 115 and 125. The multiplexed video stream is be demultiplexed, and each video stream from the demultiplexed video stream is be assigned to a touchscreen display. The user can also configure the electronic device in Paired Multiplexed Mode such that the two demultiplexed video streams are displayed side-by-side on the first touchscreen display 115, and the same is displayed on the second touchscreen display 125. The following examples illustrate the operation of Multiplexed Mode.

In a cell phone application, a video conferencing system comprising a pair of cameras and microphones can transmit a multiplexed stream comprising the two video streams from the cameras and the two audio streams from the microphones. The electronic device 100 receives the multiplexed streams of video and audio as a cell phone call, demultiplexes the streams, and displays the video and plays the audio on the electronic device 100. The electronic device 100 displays a first video stream on the first touchscreen display 115 and plays the first audio stream on the first speaker 111, and displays the second video stream on the second display 125 and plays the second audio stream on the second speaker 121. The electronic device 100 further multiplexes and transmits the video output from a camera module, 112 and 122, in each device portion of the electronic device, and the microphone output from each microphone, 114 and 124, in each device portion. In this application, the electronic device 100 functions as a portable teleconferencing system.

Figure 4A:
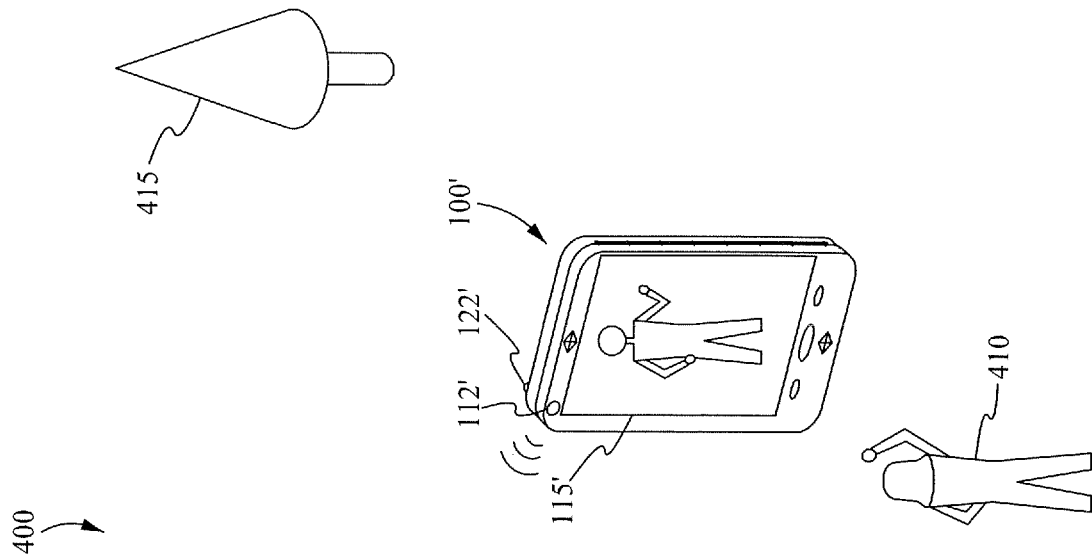
FIGS. 4A and 4B shows an electronic device having two displays being used for displaying video during a phone call, according to some embodiments.
Figure 4A:
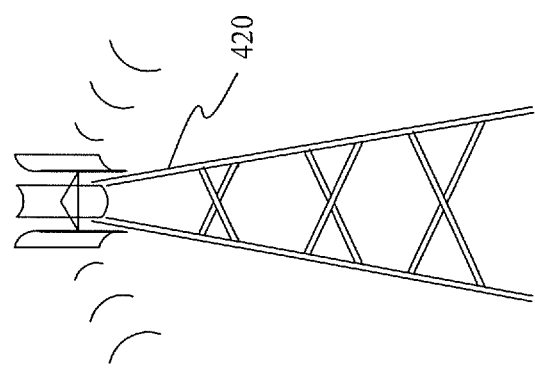
Figure 4A:
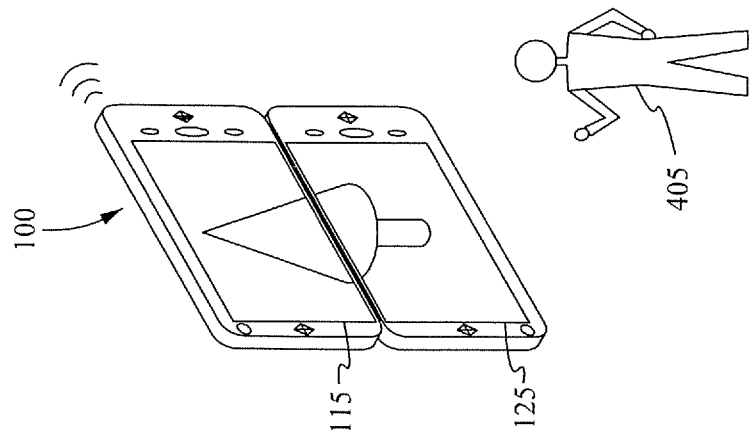
Figure 4B:
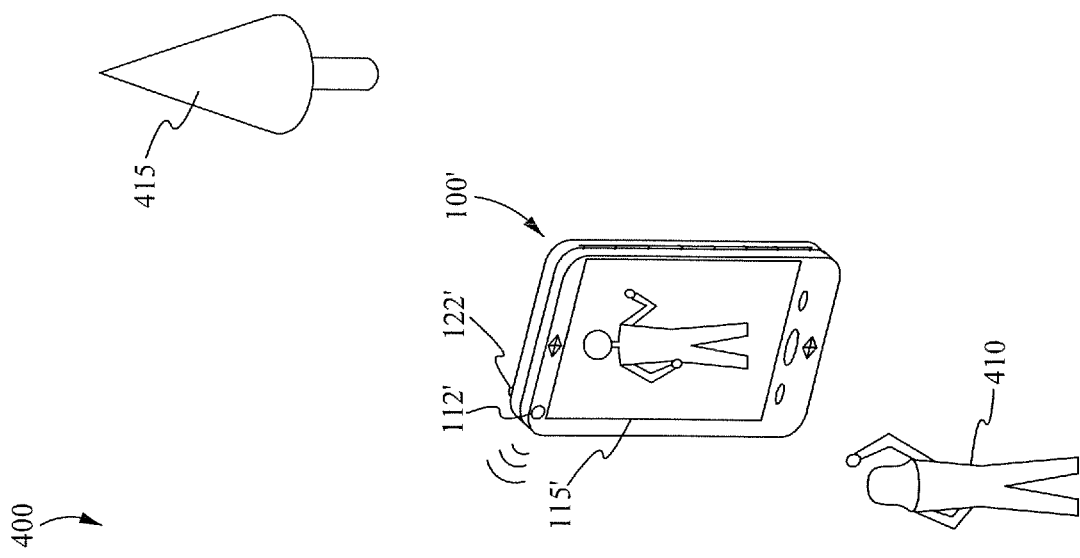
Figure 4B:
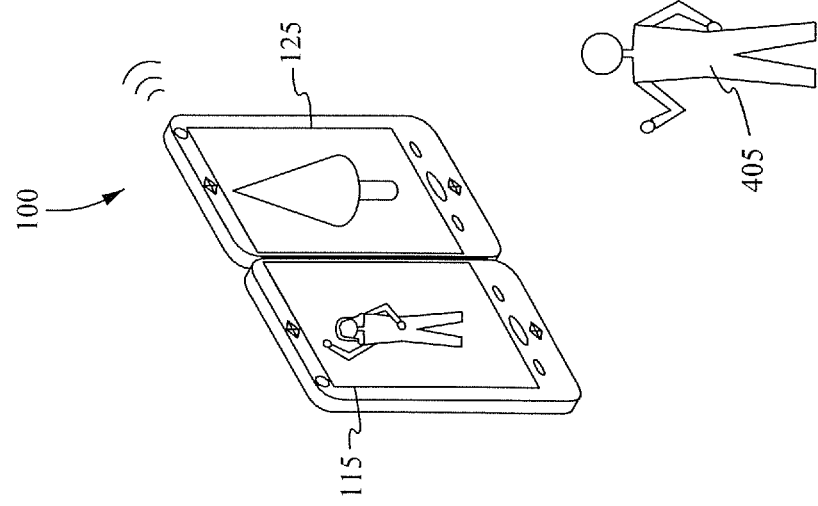

In addition, a single cell phone call user can utilize the electronic device 100 in the closed position, as shown in FIGS. 1A, 4A, and 4B. In the closed position, the two device portions, 110 and 120, are back-to-back with the first touchscreen display 115, first camera module 112, first microphone 114, second display 125, second camera module 122 and second microphone 124 facing outward. In this folded, closed position, the user faces toward the first touchscreen display 115. The first camera module 112 and first microphone 114 capture the image and speech, respectively, of the user. The second display 125, second camera module 122, and second microphone 124 face away from the user. The user can aim the second camera module 122 and second microphone 124 at something that she wants the person at the other end of the phone call to see and hear. The first touchscreen display 115 displays the video stream of the second camera 122, aimed away from the user, so that the user can monitor the view that is being transmitted to the user at the other end of the phone call. The video stream of the first camera module 112 and first microphone 114, capturing the user's image and speech, is multiplexed with the video stream of the second camera module 122 and the second microphone 124, and the multiplexed stream is transmitted over the cell phone call to the person at the other end of the phone call. If that person also has an electronic device 100 according to the presently-claimed invention, the images and audio can be demultiplexed, displayed, and played as described in the figures below.

In a security application, the electronic device 100 can receive a multiplexed video stream comprising multiple security camera streams. The electronic device can demultiplex the video streams and display each security camera stream as described in the figures below.

Independent Single Application Mode

An application can use each of the first 115 and second 125 touchscreen displays for a different function. The following examples illustrate the operation of Independent Single Application Mode.

A cell phone application utilizes the first touchscreen display 115 to display a virtual cell phone dialing interface, receive and process virtual cell phone dialing keystrokes, and use the second display 125 to display the resulting phone number entered by the user on the first touchscreen display 115. The virtual cell phone dialing interface further comprises "CALL" and "END" keys. When the user touches the "CALL" virtual key, the application generates display information informing the user that the phone is dialing the number entered, and displays that information on the second display 125.

A text messaging application can display a virtual QWERTY keypad on the first touchscreen display 115, process the virtual keystrokes, and display them on the second touchscreen display 125.

In a gaming application, the application generates a virtual game play user interface and displays it on the first touchscreen display 115. Game play actions and results generated by the gaming application are displayed on the second display screen 125. Since the game play user interface is a virtual interface generated by the application, the application can generate and display any number of virtual game play user interfaces on the first touchscreen display.

Independent Two Application Mode

An electronic device running a multitasking operating system such as Microsoft® Windows® or Google® Chrome® can allocate one touchscreen display to one application, and a second touchscreen display to a second application. For example, a user can have a map application open on the first touchscreen display 115, and a cell phone application open on the second touchscreen display 125.

Means for Detecting

As described below, in FIGS. 1B and 1D, the electronic device 100 comprises two device portions 110 and 120 that are physically, separably coupled via a hinge 130. For some applications, it may be desirable for the device to enter into a specific mode by virtue of being in a known position, and additionally, operating a specific application. For example, if the user is running a movie application and the electronic device 100 is folded closed, then the electronic device 100 automatically displays the movie in Paired Mode. If the user then opens the electronic device 100, the electronic device 100 detects that it is in the open position and enters the Full Screen Mode for watching the movie. Means for detecting the position of the first device portion 110 and the second device portion 120 can comprise a momentary switch that is depressed or released based upon the relative positions of the device portions 110 and 120. Alternatively, an electrical circuit can be made or broken when the electronic device 100 is fully open or fully closed. An optical sensor can be used to detect the presence, or occlusion, of light to detect the relative position of the device portions 110 and 120. A Hall-effect sensor can be used to detect whether a magnet in one device portion (110, 120) is sufficiently close to a Hall-effect sensor in the other device portion (120, 110) in order to determine the relative position of the device portions 110 and 120. One skilled in the art will recognize other means for detecting the relative position of the device portions 110 and 120. The same means can be used to determine whether the first 110 and second 120 device portions are physically coupled.

FIGS. 1A-1D show an electronic device 100 having two displays. FIG. 1A shows the electronic device 100 in a closed position. The electronic device 100 comprises two device portions, 110 and 120. The first device portion 110 houses a first touchscreen display 115, a keypad 113, a microphone 114, a camera module 112, a speaker 111, and an internal communications module (not shown). The communications module is wireless and implements the functionality of a cell phone. The communications module can support well-known communications standards such as WiFi, 3G, 4G, CDMA, TDMA, and IEEE 802.11a, b, g, and n. The first device portion 110 is physically, separably, and hingedly coupled to the second device portion 120 via a hinge 130. One skilled in the art will recognize that some of the communications functionality could be implemented by wired communications well-known in the art. The first device portion 110 comprises a switch or sensor 131 to detect when the two device portions 110 and 120 are in an open, substantially planar position.

Figure 1B:
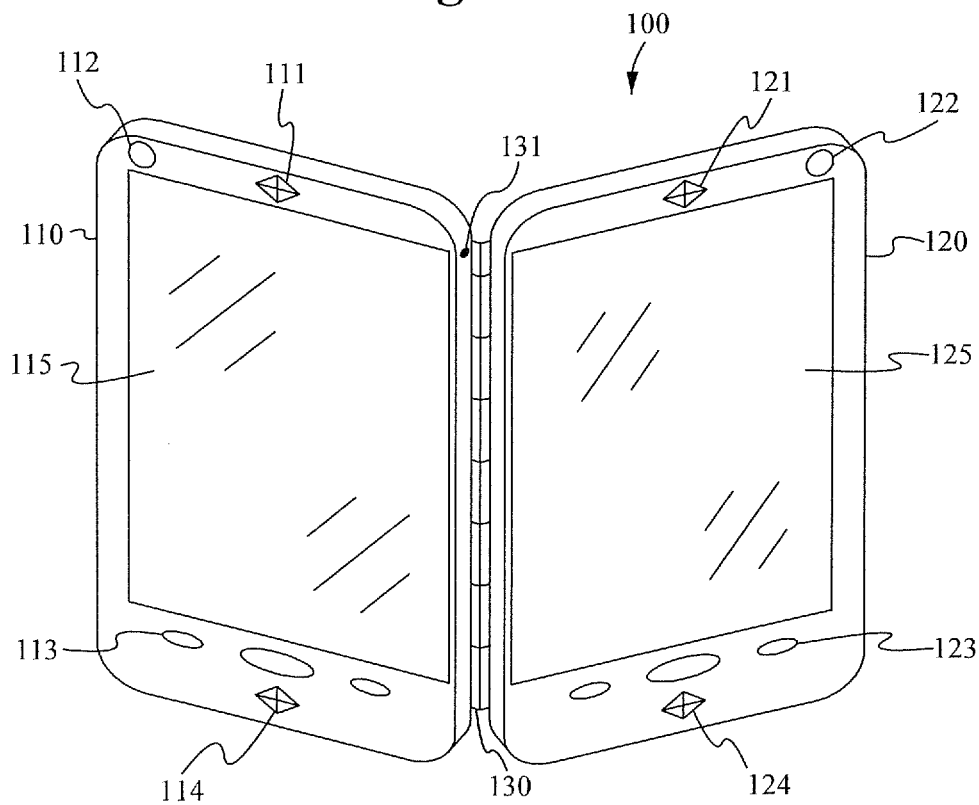

FIG. 1B shows the electronic device 100 in a partially open position, showing both the first device portion 110 and the second device portion 120. The second device portion 120 houses a display screen 125, a keypad 123, a microphone 124, a camera module 122, and a speaker 121. The second display 125 can be a touchscreen display. The first device portion 110 and the second device portion 120 are wirelessly, communicatively coupled through the communications module. The camera modules 112 and 122, the microphones 114 and 124, the keypads 113 and 123, the speakers 111 and 121, and the first touchscreen display 115 and the second display 125 are all interfaced to the communications module. The first device portion 110 comprises a switch or sensor 131 to detect when the two device portions 110 and 120 are in an open, substantially planar position. In the open, substantially planar position, the first touchscreen display 115 and the second display 125 can comprise a single, larger display that is substantially the combination of the areas of the two displays.

Figure 1C:
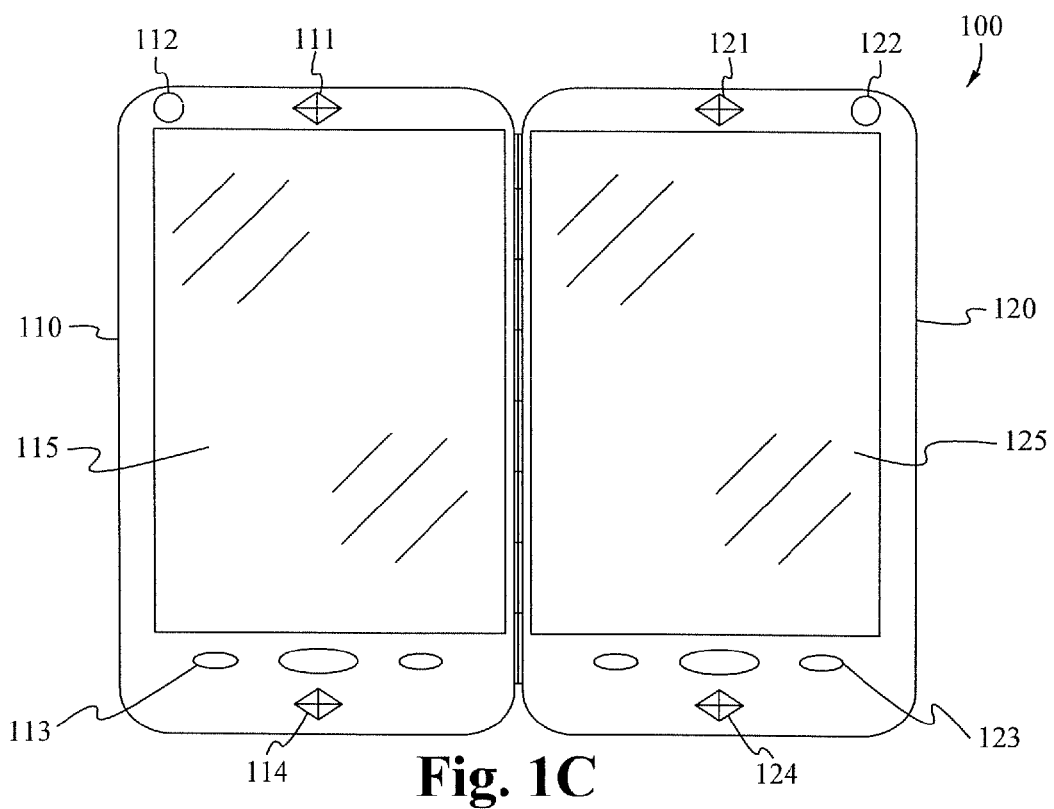

FIG. 1C shows the electronic device 100 in a fully open position. The fully open position is detected by a switch 131 shown in FIG. 1B. The switch 131 can be a momentary switch, made or broken on fully opening the electronic device 100. One skilled in the art will recognize that the switch 131 can alternatively be a sensor that can be used in lieu of a switch, and that such sensor can comprise one, or two, components. In some embodiments, an opto-detector comprises a single component, and the open position is detected by the occlusion of light reaching the opto-detector. In some embodiments, the sensor is a Hall-effect sensor and magnet pair. The magnet is located in one device portion, such as 110, and the Hall-effect sensor is located in a corresponding position in the other device portion 120. In some embodiments, the open position is detected by making or breaking an electrical contact between the first portion 110 and the second portion 120 such as with a spring-loaded pogo pin and a mating contact.

Figure 1D:
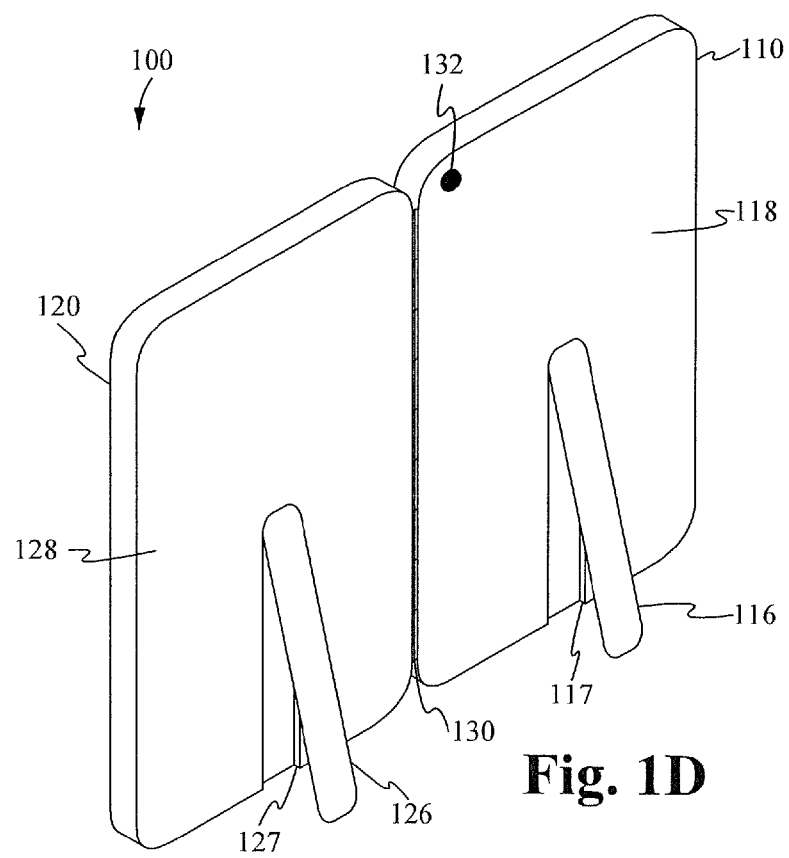

FIG. 1D shows a rear view of the electronic device 100. A switch 132 can be used to detect when the electronic device 100 is in a closed position. In the closed position, shown in FIG. 1A, the rear face 118 of the first device portion 110 is substantially in contact with the rear face 128 of the second device portion 120. As with the open position detection switch 131, described above, the closed position detection switch 132 can be a single switch, or a sensor comprising one or two components. One skilled in the art can readily determine alternative components for implementing both the open position detection switch 131 and the closed position detection switch 132. The rear view, FIG. 1D, of the electronic device 100 further shows each device portion, 110 and 120, having a retractable stand, 116 and 126, respectively. The retractable stands, 116 and 126, retract into recesses 117 and 127, respectively, such that the retracted stands 116 and 126 are flush with the rear faces 118 and 128 of the first and second device portions 110 and 120. The first and second device portions 110 and 120 are physically, separably, and hingedly coupled together at the hinge 130.

Figure 2A:
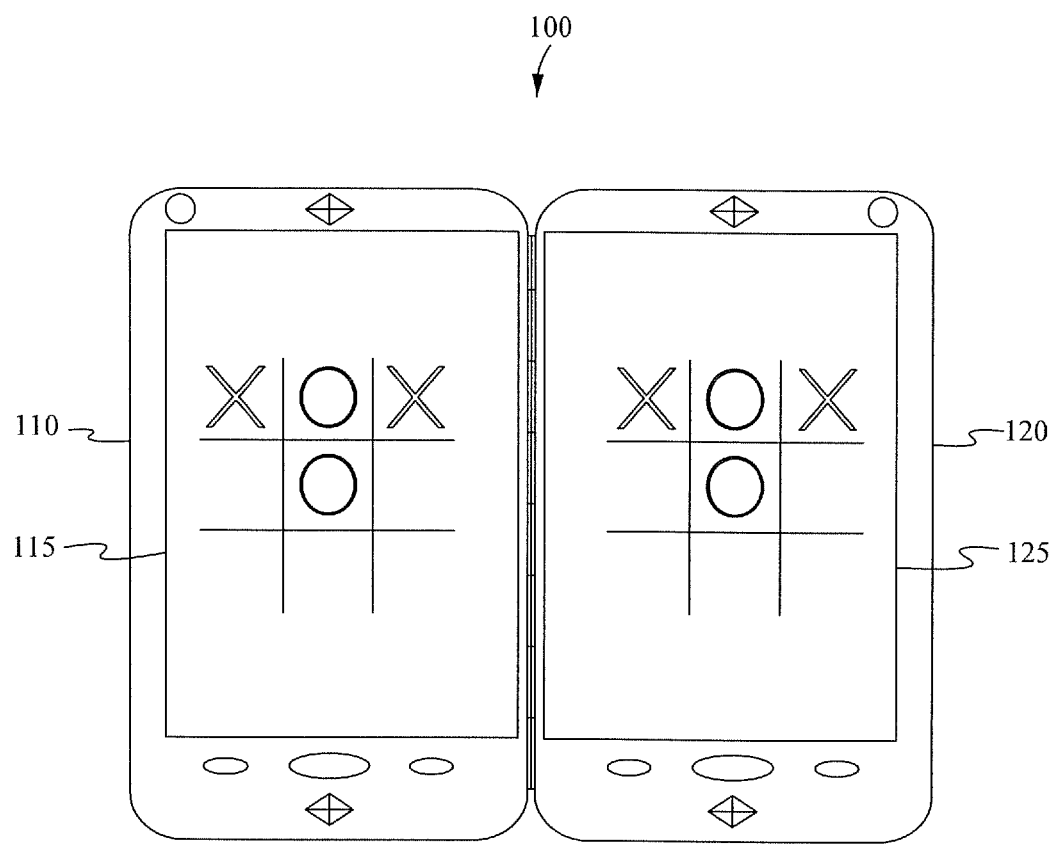
FIGS. 2A-2E shows an electronic device having two displays displaying picture information, according to some embodiments.
Figure 2B:
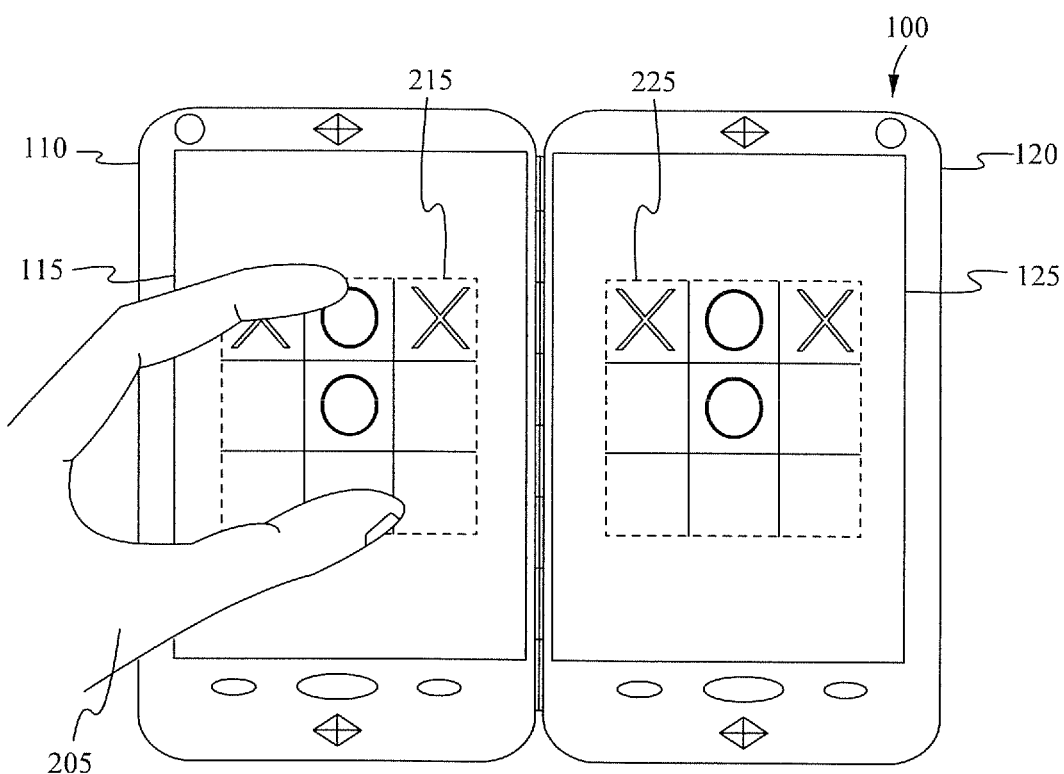
Figure 2C:
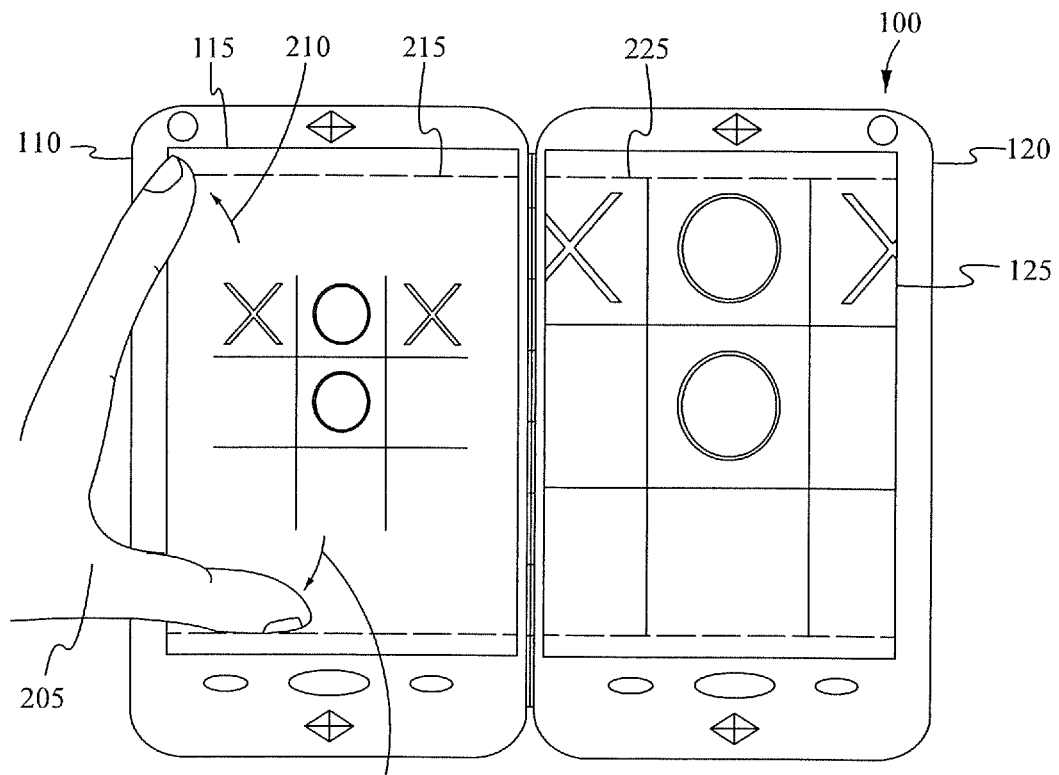
Figure 2D:
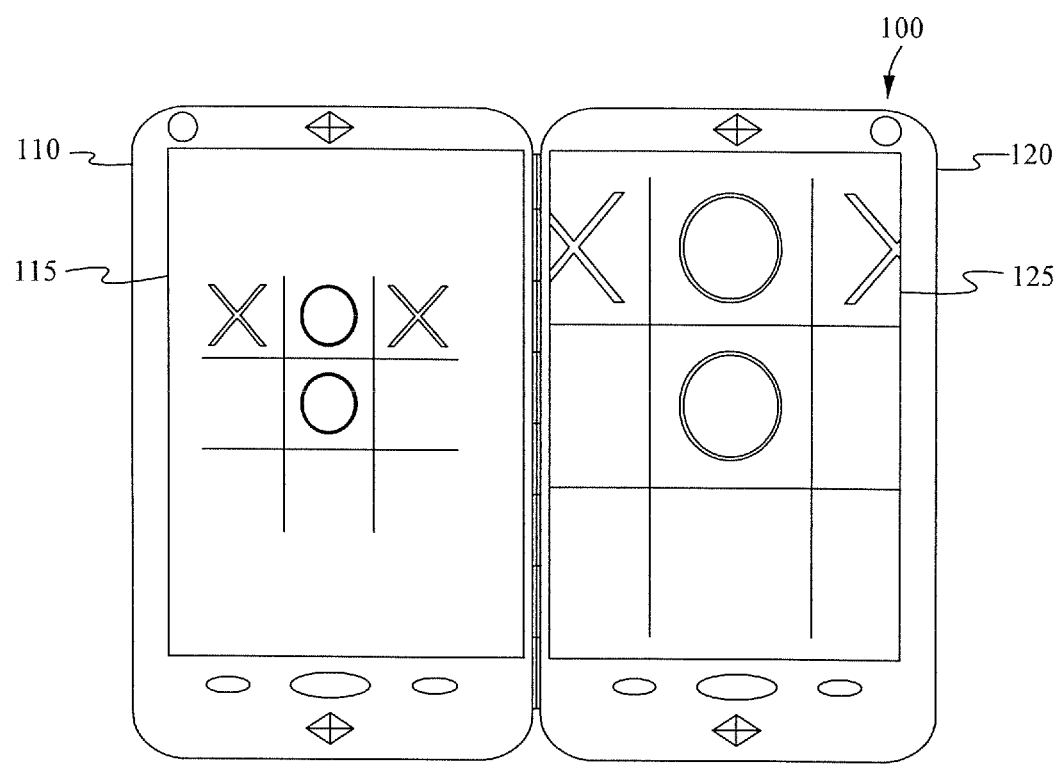
Figure 2E:
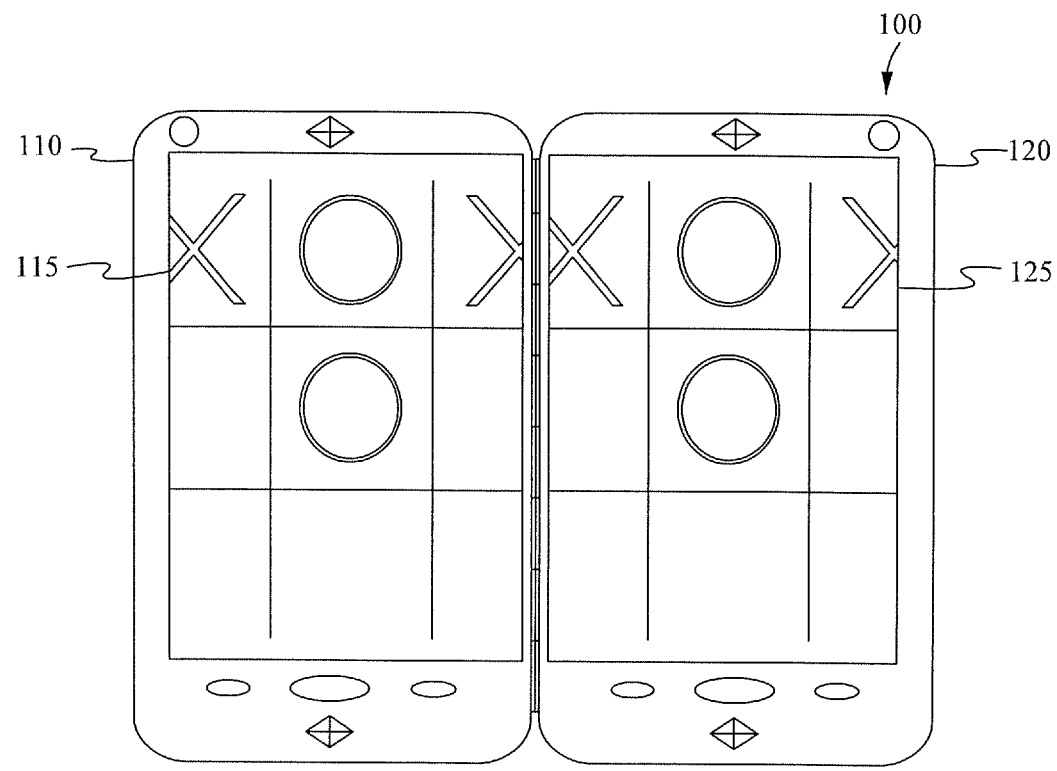

FIGS. 2A-2E illustrates the electronic device 100 displaying image information. FIG. 2A shows a picture displayed on the first touchscreen display 115 and on the second display 125. FIG. 2B shows the user's hand 205 preparing to make an "expand" gesture on the touchscreen 115 using her thumb and forefinger. The user's hand 205 at least partially obscures the view of the picture and an expansion frame line 215 on the first touchscreen display 115. FIG. 2C shows the user separating her thumb and forefinger, thereby making the "expand" gesture 210 on the first touchscreen display 115 in order to trigger the execution of a command to zoom in on the picture. As the user makes the expand gesture 210 on the first touchscreen display 115, an expansion frame line 215 is shown to the user indicating how much expansion will result from the user's expansion gesture. A corresponding expansion frame line 225 is shown on the second display 125. In this way, the user can see how much expansion of the picture will result from the user's expansion gesture on the first touchscreen display 115. FIG. 2D shows the first touchscreen display 115 and the second display 125 after the completion of the expansion command 210. The second display 125 shows the expanded picture without the expansion command frame line 225, after the user has completed the expansion command 210. The first touchscreen display 115 shows the unexpanded picture without the expansion frame line 215. In FIG. 2E, the first touchscreen display 115 alternatively shows the expanded picture without the expansion frame line 215, the same as is shown in the second display 125.

Figure 3A:
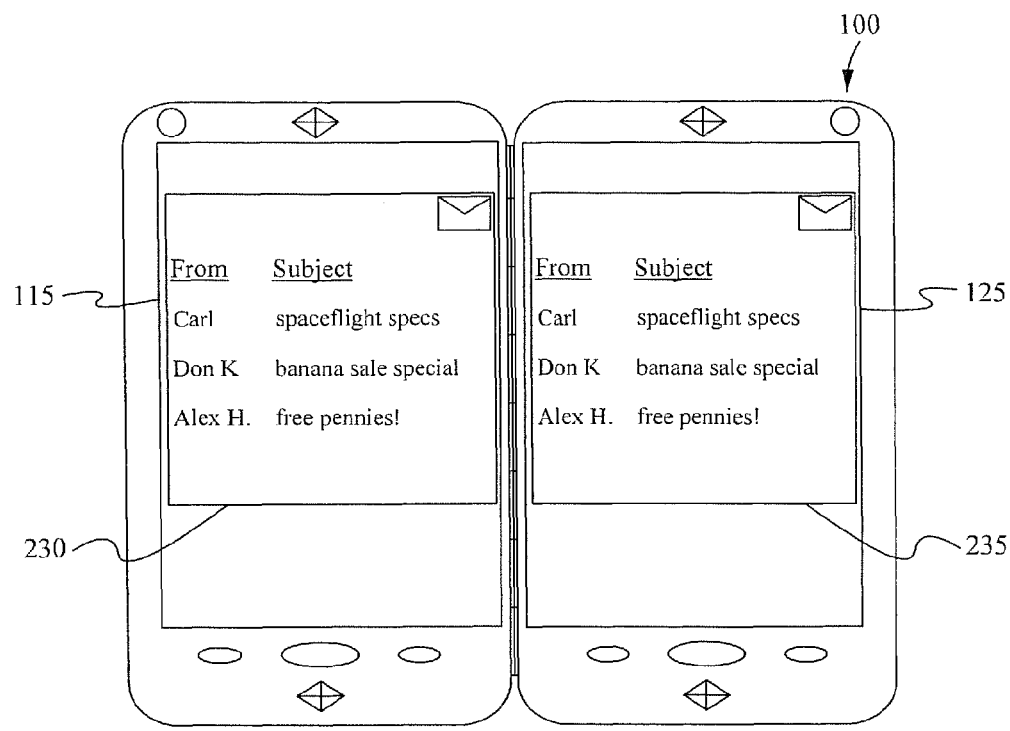
FIGS. 3A-3D shows an electronic device having two displays displaying email information, according to some embodiments.
Figure 3B:
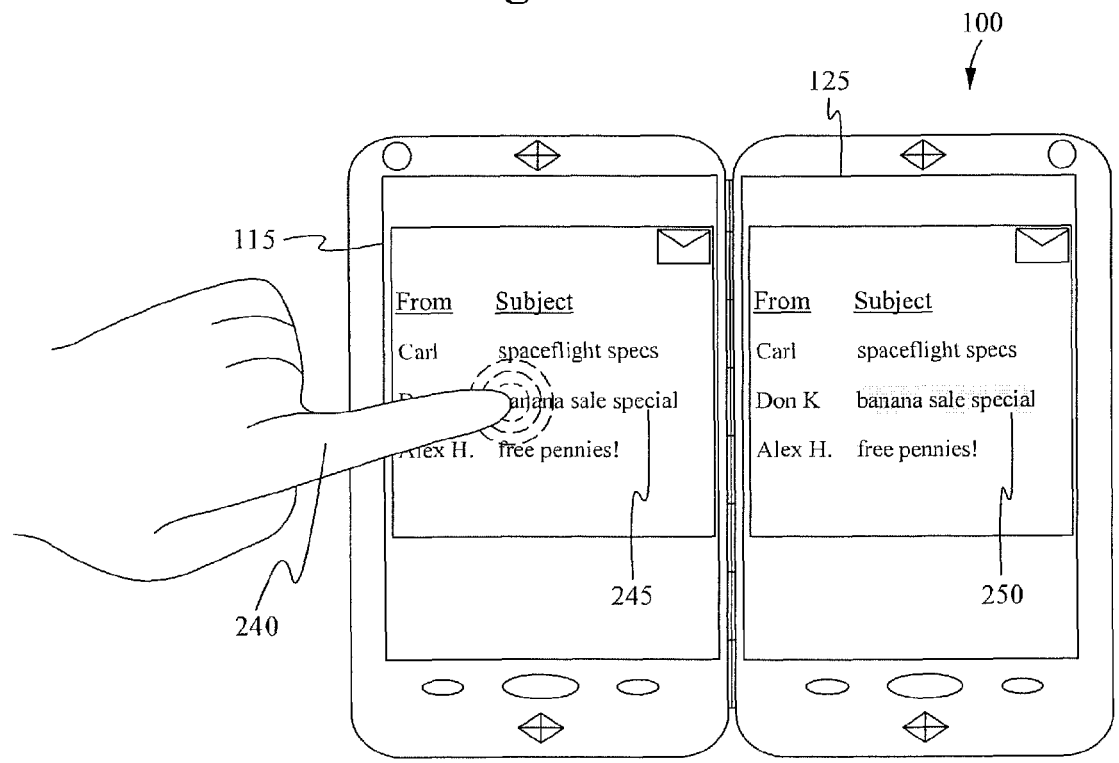
Figure 3C:
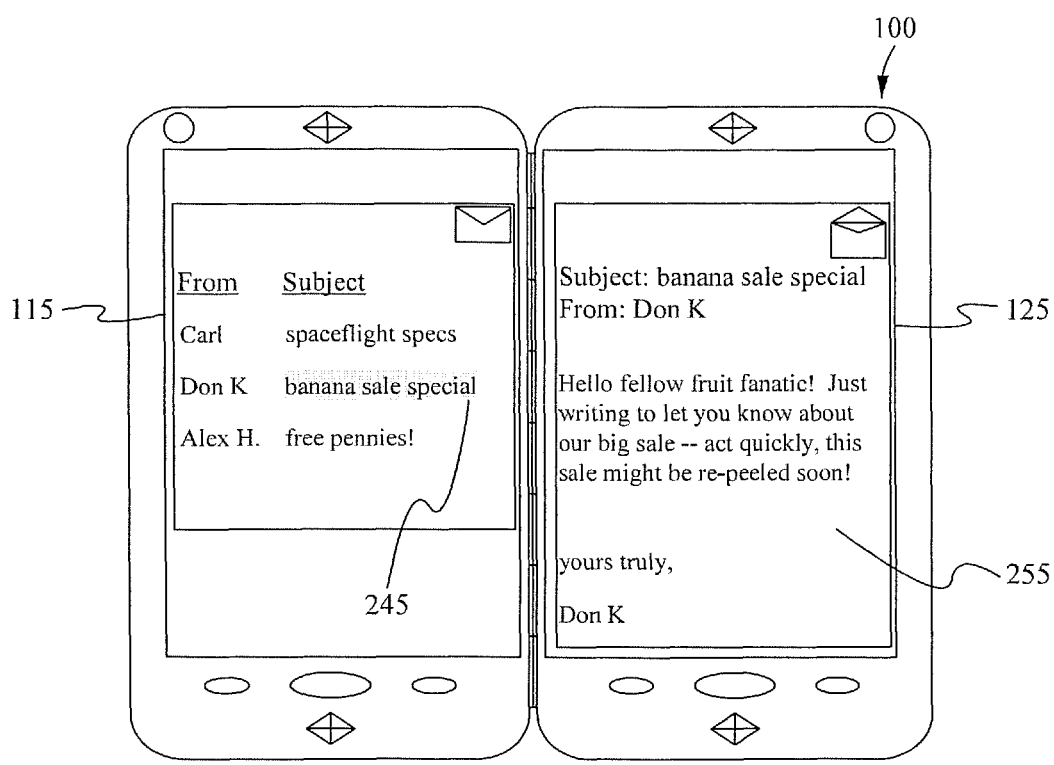
Figure 3D:
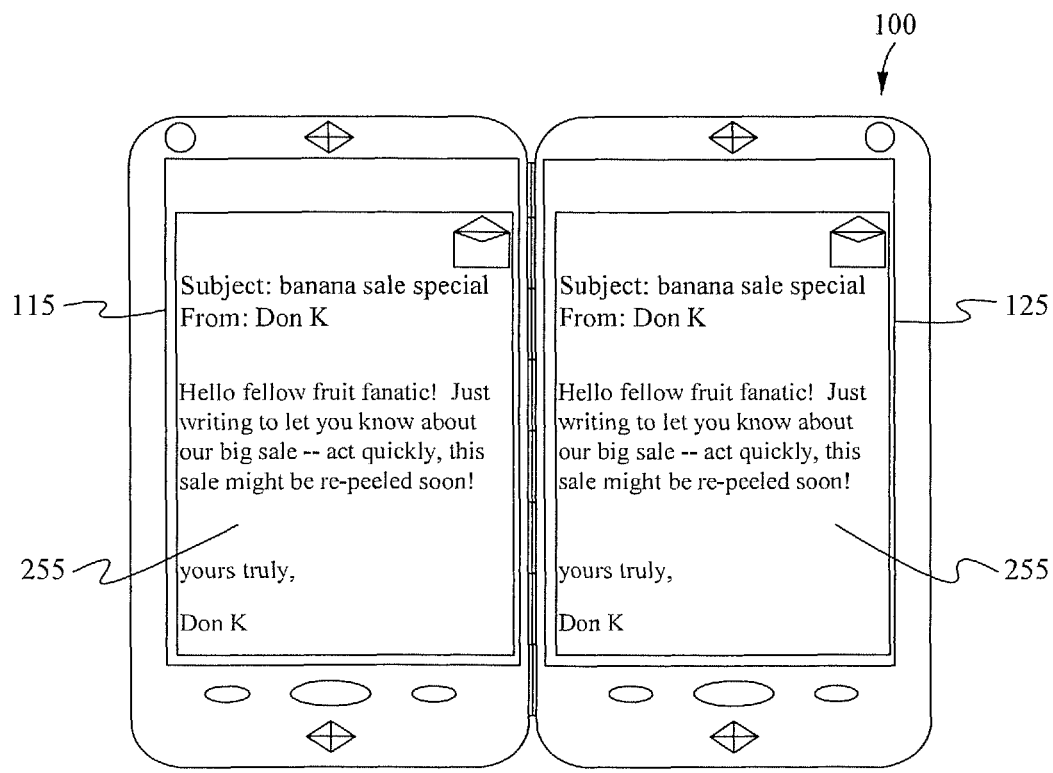

FIGS. 3A-3D show the electronic device 100 displaying email information. In FIG. 3A, the first touchscreen display 115 shows the inbox 230 of an email application. The second display 125 also shows the inbox of the email application 235. The inbox includes a listing of email messages in the email inbox, as is well-known in the art. FIG. 3B shows a user selecting one email message from the inbox for viewing by tapping the subject line 245 of the email message with a finger 240. The electronic device 100 is able to show a visual indication 250, and/or play an audible indication (not shown), of the user's selection of the email message. The visual indication 250 can be displayed on the first touchscreen display 115, the second display 125, or both 115 and 125. In FIG. 3C, the subject line 245 of the selected email message is highlighted in the first touchscreen display 115 to indicate which email message is currently being displayed on the second display 125. The email message detail 255 is shown in the second display 125. Using this method of displaying information on the electronic device 100, the user can review the detail of many email messages very quickly, without the user's hand obscuring the view of the email message. The user can alternatively select to have the detail view of an email message be shown in both the first touchscreen display 115 and the second display 125 as shown in FIG. 3D.

FIGS. 4A and 4B shows an electronic device 100 being used for displaying video during a phone call via a cell tower 420 on electronic devices 100 and 100'. In FIG. 4A, a first user 405 having the first electronic device 100 is on a cell phone call with a second user 410 having a second electronic device 100' having similar components and functionality. The second user's electronic device 100' is in the closed position, with the first camera module 112' facing her and with the second camera module 122' facing a tree 415. The video stream of both camera modules 112' and 122' is sent over the cell phone connection to the first electronic device 100. Alternatively, a user can configure which camera video stream, if any, is to be transmitted by her electronic device during the cell phone connection. The first electronic device 100 is in the open position such that it can utilize the first touchscreen display 115 and the second display 125 as a single, larger display to display the video stream received from the second camera module 122'. In FIG. 4A, the first user 405 has configured his electronic device 100 to display only the video stream from the camera module 122'. The camera module 112 output on the first electronic device 100 is transmitted as a video stream showing the first user 405 to the second device 100'. The second camera module 122 can also transmit a video stream from the second camera module 122 thereby transmitting a stereoscopic video image of the user 405 to the second electronic device 100'.

In FIG. 4B the first user 405 has configured his electronic device 100 to display the video streams from both of the camera modules 112' and 122' of the second electronic device 100'. A mercury switch or other sensor (not shown) can be incorporated into the electronic devices 100 and 100' to automatically detect an orientation change of the electronic devices 100 and 100' in order to automatically adjust the view shown to the user. In FIG. 4B, the first electronic device 100 is oriented in a side-by-side portrait orientation.

Figure 5A:
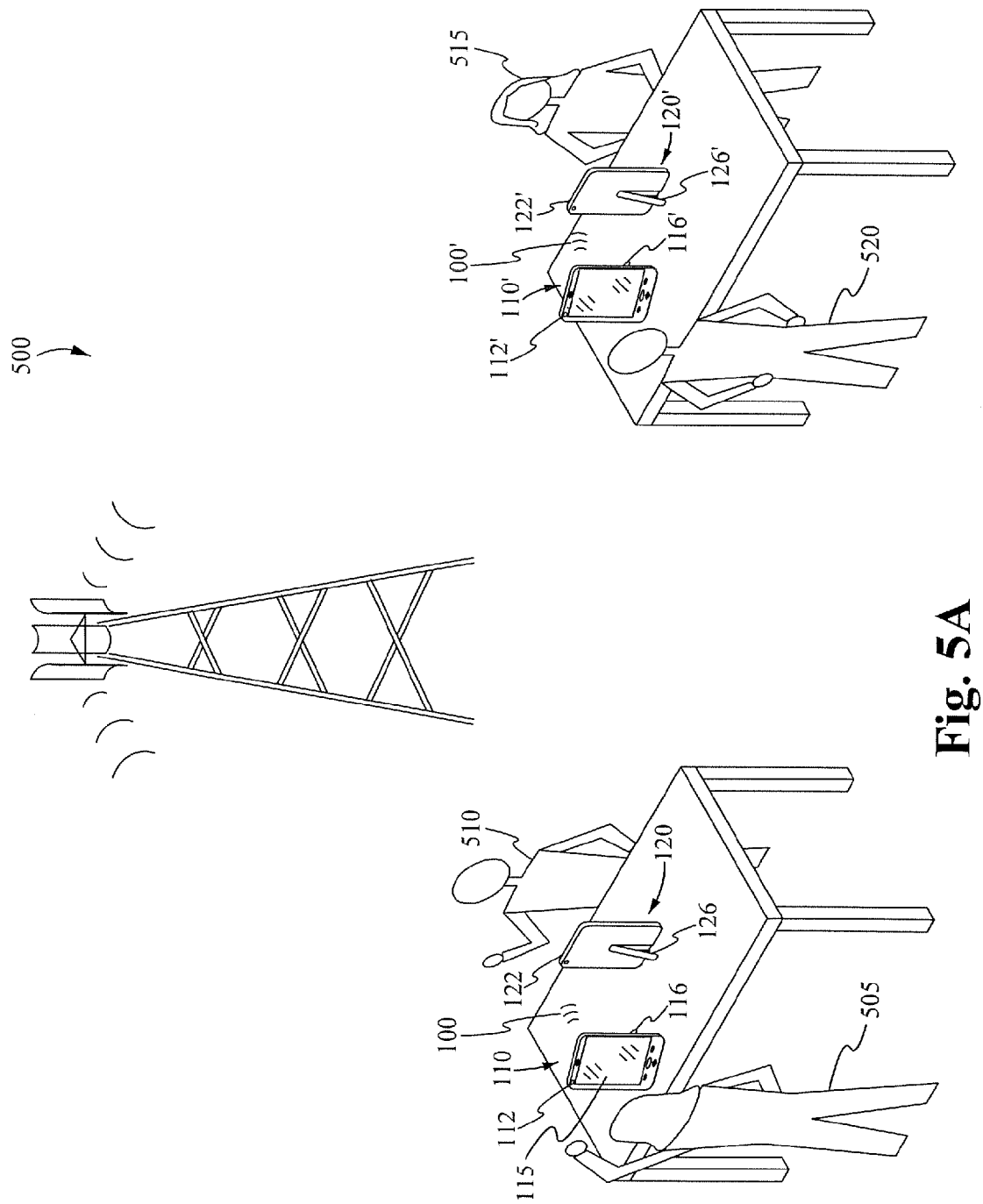
FIGS. 5A and 5B show a pair of electronic devices having two displays being used for a video conference call, according to some embodiments.
Figure 5B:
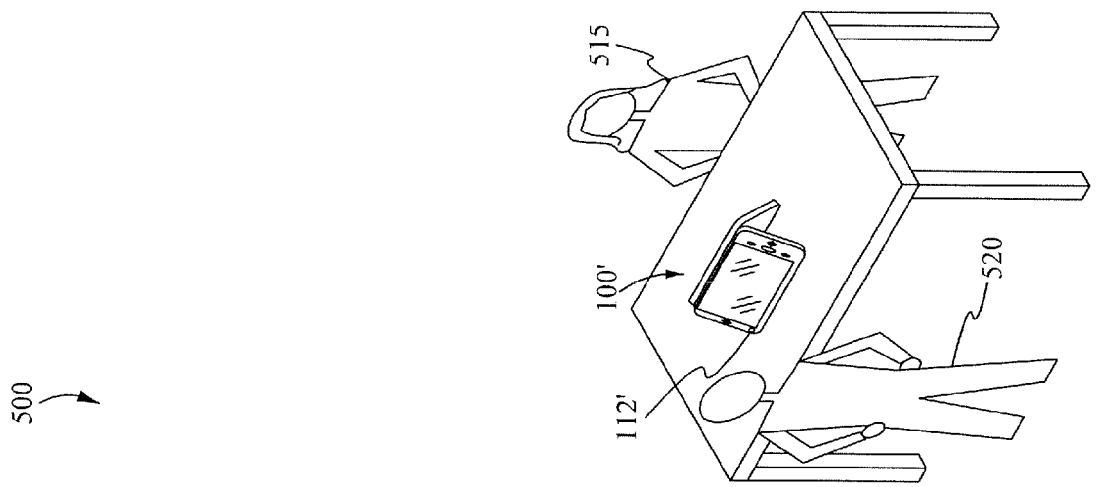
Figure 5B:
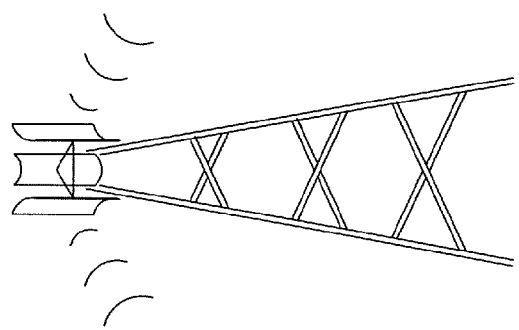
Figure 5B:
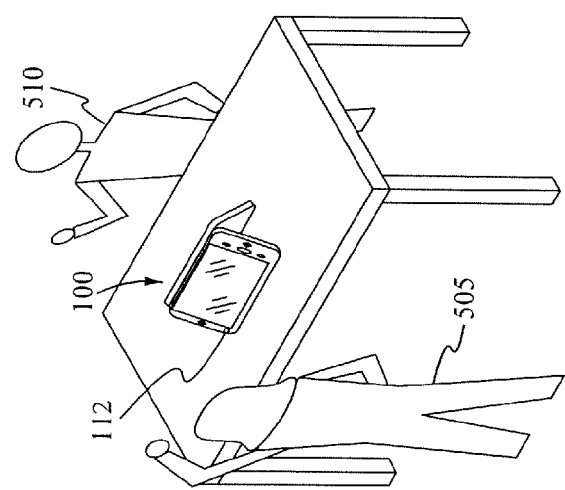

FIGS. 5A and 5B show a pair of electronic devices 100 and 100' being used for a video conference call. A first pair of users 505 and 510 are seated at a conference table in a first location. The first electronic device 100 is physically separated into the first device portion 110 and the second device portion 120. The two device portions, 110 and 120, are held in upright positions through use of retractable stands 116 and 126, respectively, described above in FIG. 1D. The camera module 112 in the first device portion 110 is directed toward the user 505. The camera module 122 in the second device portion 120 is directed toward the second user 510. The microphone elements 114 and 124, not shown, and the speaker elements 111 and 121 (not shown) of each device portion, 110 and 120, respectively, are similarly oriented, inherently, by the positioning of the device portions, 110 and 120 for the camera position. A second pair of users 515 and 520 are located at a second location and are seated in front of a second electronic device 100' in the same manner as the first pair of users 505 and 510. The user 505 configures the first electronic device 100 to transmit the output of both the first camera module 112 and the second camera module 122 as a video stream during a cell phone conference call. The audio stream from the first microphone 114 and second microphone 124 are similarly transmitted. The first user 505 uses the first touchscreen display 115 on the first electronic device 100 to make a cell phone call to the second electronic device 100'. The second pair of users 515 and 520 have the second electronic device 100' similarly configured for the conference call. The first electronic device 100 receives an input stream from the second electronic device 100' comprising two video streams, one from the output of each camera module 112' and 122', and two audio streams, one from the output of each microphone 114' and 124' (not shown). The first device portion 110 separates the input stream into its two video streams and two audio streams. The first device portion 110 can then display one of the two received video streams on its first touchscreen display 115 and the other received video stream on the second display 125 (facing user 510, not shown). Alternatively, both of the received video streams are displayed on both the first touchscreen display 115 and the second display 125. Typically, both received audio streams are directed to both the first speaker 111 and the second speaker 121, as shown in FIGS. 1A-1D, but this need not be the case. Operation of the second electronic device 100' is analogous to that of the first electronic device 100. The operation of the first and second electronic devices 100 and 100' can be independently configured. One skilled in the art will recognize that the first and second device portions 110 and 120 need not necessarily be separated for purposes of a conference call as described above. The first and second device portions 110 and 120 can be physically, hingedly coupled, and the electronic device 100 placed on a table between two users 505 and 510, in a partially open position, in either landscape or portrait orientation, as shown in FIG. 5B.

Figure 6A:
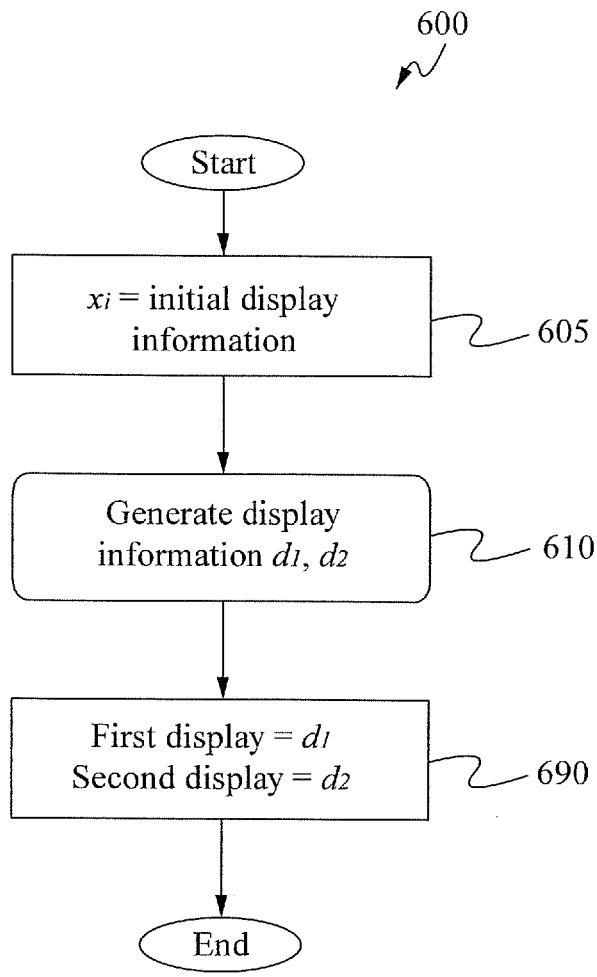
FIGS. 6A-6D show a flow diagram for a method of displaying information on an electronic device having two displays, according to some embodiments.
Figure 6B:
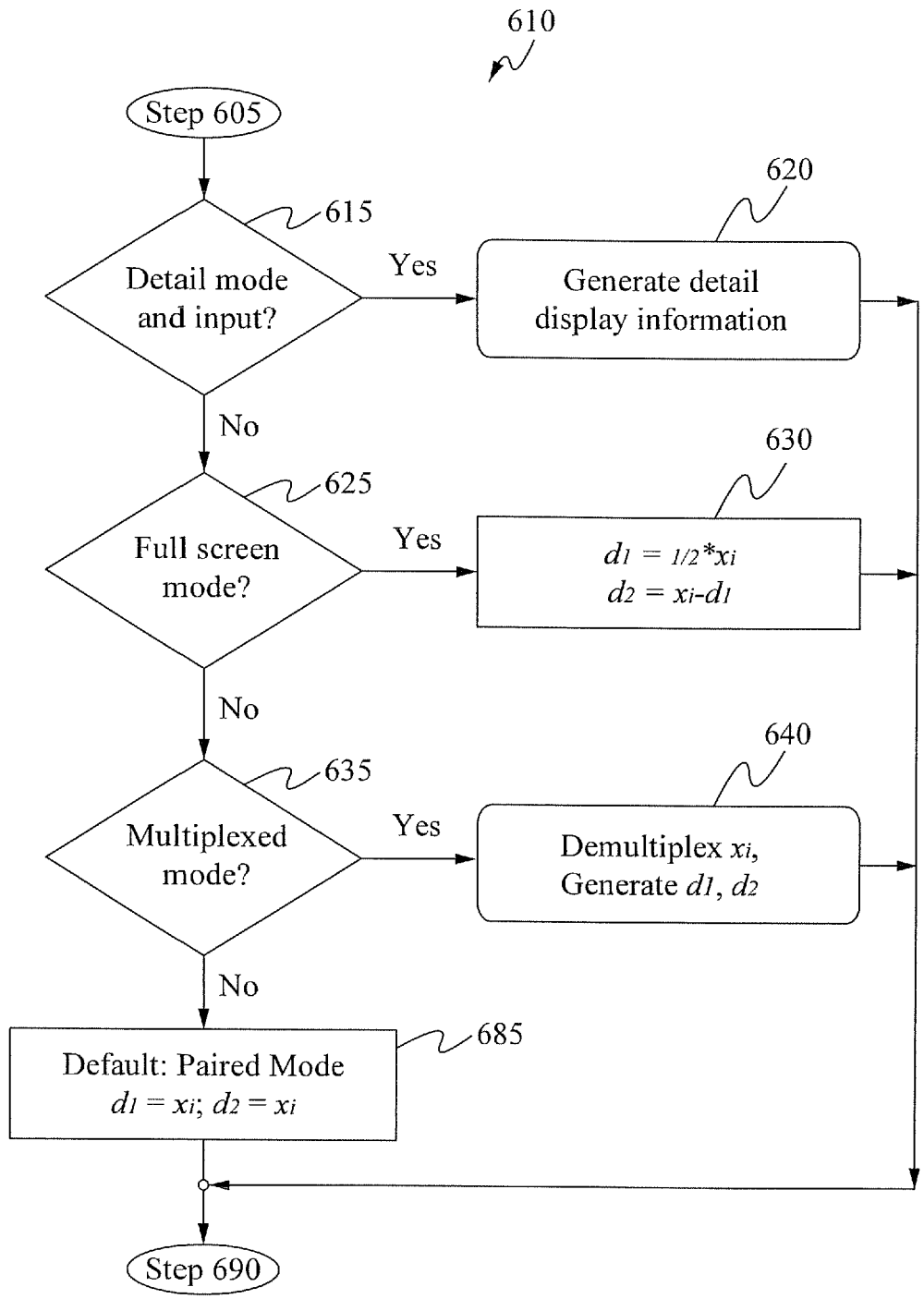

FIGS. 6A-6D show flow diagrams for a method 600 of displaying information on the electronic device 100. In FIG. 6A, at the top level of the flow diagram 600, an application receives initial display information designated $x_i$ at step 605. The application applies an algorithm in step 610 to generate display information $d_1$, and $d_2$ corresponding to the first touchscreen display 115 and the second display 125, respectively. The details of step 610 are shown in FIG. 6B. At step 690, display information $d_1$ is sent to the first touchscreen display 115 and display information $d_2$ is sent to the second display 125 and the method ends.

In FIG. 6B, the method step 610 analyzes the display mode in which the application is interacting with the first touchscreen display 115 and the second display 125. At step 615, if the application is operating in Detail Mode and user input has been received, then at step 620 the method generates detail information from the display information $x_i$ and the user input as shown in more detail in FIG. 6C, otherwise the method proceeds to step 625. In step 625, if the application is operating in Full Screen Mode, then the method proceeds to step 630 where the display information $d_1$ is set to one half of the display information $x_i$, and display information $d_2$ is set to the other half of the display information $x_i$, otherwise the method proceeds to step 635. In step 635, if the display information $x_i$ comprises a multiplexed video signal, then the method goes to step 640 where the display information is demultiplexed as shown in more detail in FIG. 6D, and display information $d_1$ and $d_2$ is generated, otherwise, the method proceeds to step 685. In step 685, the default mode, Paired Mode, assigns the display information $x_i$ to both $d_1$ and $d_2$.

Figure 6C:
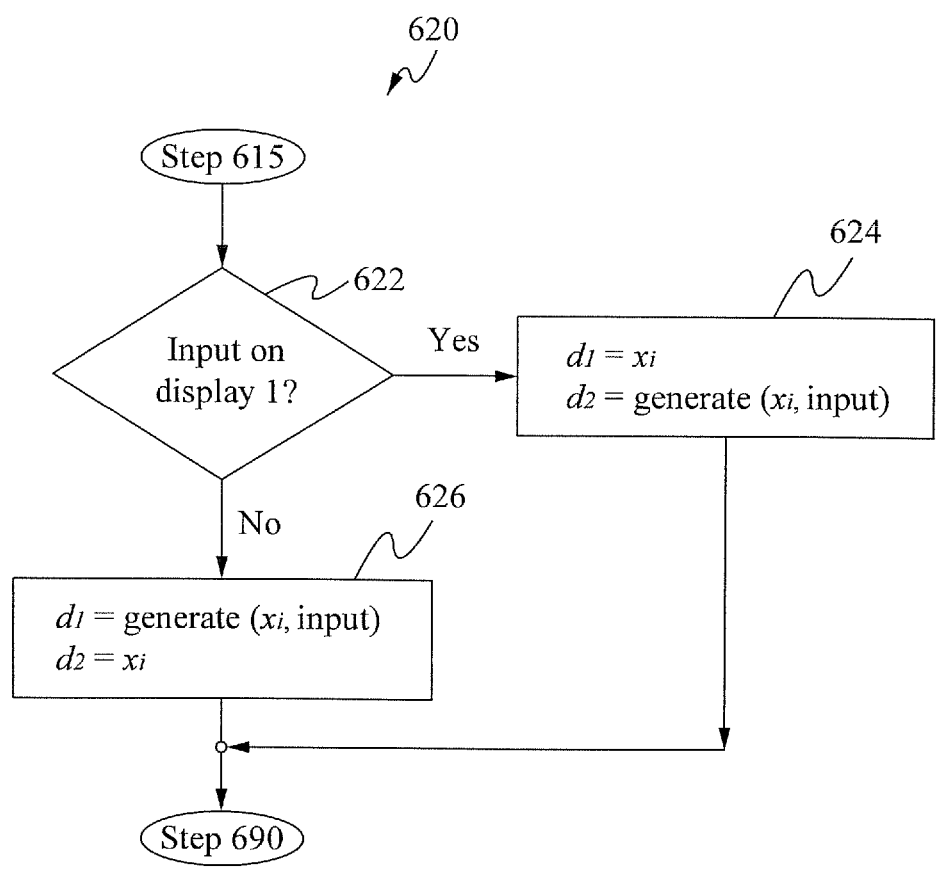

In FIG. 6C, the method step 620 processes input to a touchscreen. Step 620 assumes that both displays 115 and 125 are touchscreens and a user input has been received from one of the touchscreens. At step 622, if the user input was received on the first touchscreen display 115, then at step 624 $d_1$ is set to the display information $x_i$, and the application generates new display information for $d_2$ based upon the existing display information $x_i$, and the user input. Otherwise, at step 626 the application generates new display information for $d_1$ based upon the existing display information $x_i$ and the user input on the second touchscreen display 125, and $d_2$ is set to the display information $x_i$. The operation of this method is exemplified by an email inbox. The display information $x_i$ is the email inbox. A user input is, for example, the selection of an email message to display. Upon receipt of the user input on one display, the application generates the display new information for the detail of the email message, which is then displayed on the other display.

Figure 6D:
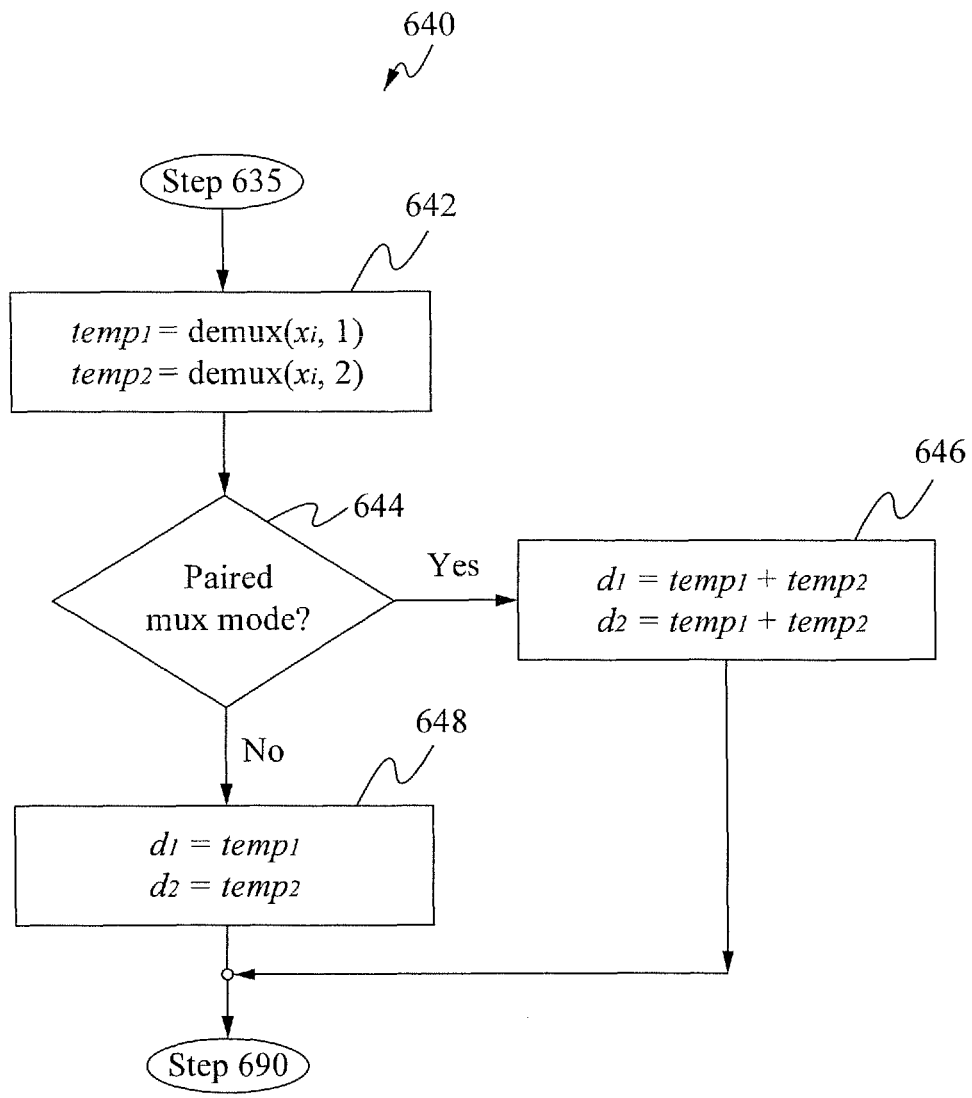

In FIG. 6D, the method step 640 processes video information $x_i$ comprising a multiplexed video signal, such as from multiple security cameras or a telephone conference call using multiple cameras. At step 642, the application demultiplexes the display information $x_i$ into two display information $temp_1$ and $temp_2$. At step 644, if the user selected Paired Multiplexed mode, then the method proceeds to step 646 where the application generates a side-by-side image of the demultiplexed stream and assigns it to both $d_1$ and $d_2$. Otherwise, at step 648, $d_1$ is set to $temp_1$, and $d_2$ is set to $temp_2$ and the method returns to FIG. 6B after step 640. Upon return to FIG. 6B, the method returns from FIG. 6B to FIG. 6A after step 610, and before step 690.

FIGS. 7A-7E show a dialog box 700 for configuring an application to use the first touchscreen display 115 and the second display 125 on the electronic device 100 according to one embodiment. The dialog box 700 comprises common controls such as an "OK" button 701, a "Cancel" button 702, a "Delete" button 703, a window sizing control 704, a close window control 705, and a window minimization control 706. The controls 701-706 are known in the art and are common to the dialog box 700 in all of FIGS. 7A-7E.

Figure 7A:
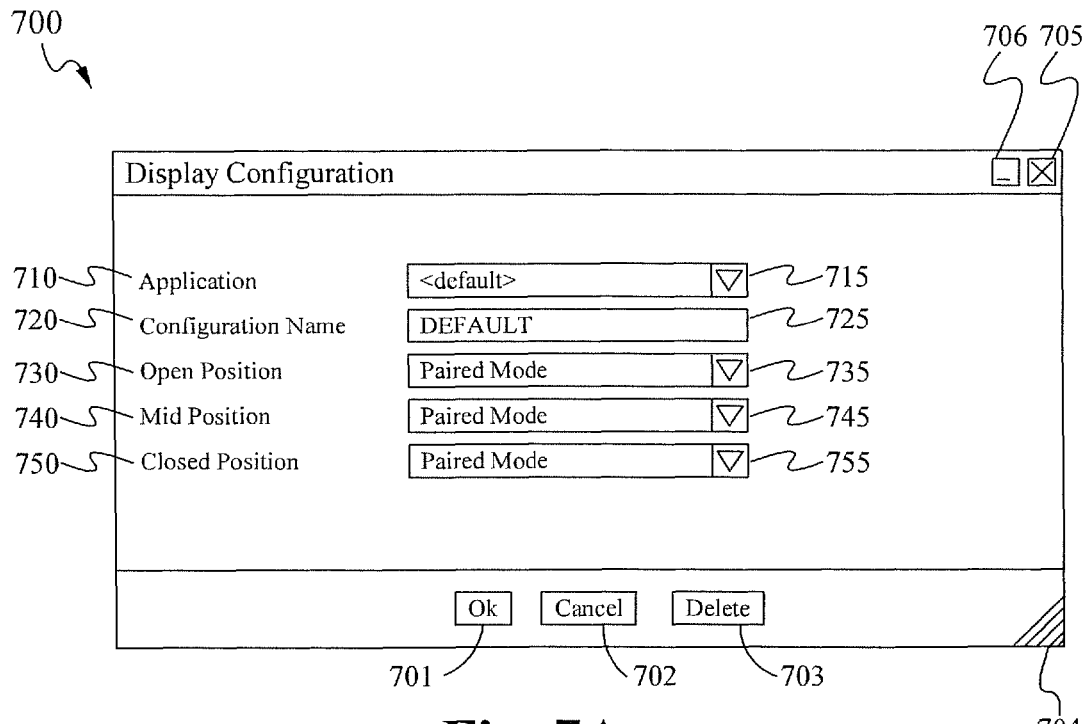
FIGS. 7A-7E show a dialog box for configuring an application to use the first touchscreen display and the second display on an electronic device, according to some embodiments.

The dialog box 700 in FIG. 7A shows a default configuration for the displays, absent a rule defining a configuration. The Application field 710 comprises a drop-down list 715 of all applications on the electronic device 100 from which the user selects an application for display configuration. The "<default>" application represents the display configuration used for all applications, absent a rule defining a configuration for an application. The Configuration Name field 720 comprises a combo box 725 for the user to enter a name associated with the application and the configuration. As is known in the art, a combo box is a window control allowing the user to select from a list of previously made entries into the field, or to add a new entry into the field. The combo box 725 allows the user to select from previously stored named configurations for recall, editing, or deletion, and allows the user to enter a new named configuration for the application. For example, a cell phone application, in field 715 may have several different named configurations for different cell phone uses. Examples of named configurations for a cell phone application include "Text Message", "Teleconference", "Person to Person", and "Person to Person with Video". The configuration information in the Display Configuration dialog box 700 can be stored and indexed by Configuration Name 725, by the pair Application 715 and Configuration Name 725, or by other indexing means known in the art. The Open Position field 730 comprises a drop-down list 735 from which the user can specify the display mode to be used for the application when the electronic device 100 is in the open position as shown in FIG. 1C. The drop-down list 735 is populated with the display mode names described below: Paired Mode, Detail Mode, Full Screen Mode, Multiplexed Mode, Multiplexed Paired Mode, Independent Single Application Mode, and Independent Two Application Mode. The Mid Position field 740 comprises the same drop-down list of display modes as the Open Position field 730. The user selects a display mode from the list 745 to be used for the application when the electronic device 100 is in the middle position. The middle position is any position where the electronic device 100 is not open and not closed. The Closed Position field 750 comprises the same drop-down list of display modes as the Mid Position field 740. The user selects a display mode from the list 755 to be used for the application when the electronic device 100 is in the closed position. The default configuration of the electronic device 100 is Paired Mode. Thus, an application, by default, displays the same display information on the first touchscreen display 115 as it does on the second display 125, regardless of position. In some embodiments, the user can edit the "<default>" application rule to use a different display mode, such as Independent Single Application Mode or Full Screen Mode. The user can click the "Ok" button 701, and the configuration will be stored. The user can click the "Cancel" button 702, and the configuration will be canceled and not saved. The user can click the "Delete" button 703 to delete the displayed configuration. In some embodiments, clicking the Cancel button 702 closes the dialog box 700. Alternatively, the dialog box 700 is closed when the user clicks the "Close Window" button 705, as is known in the art.

Figure 7B:
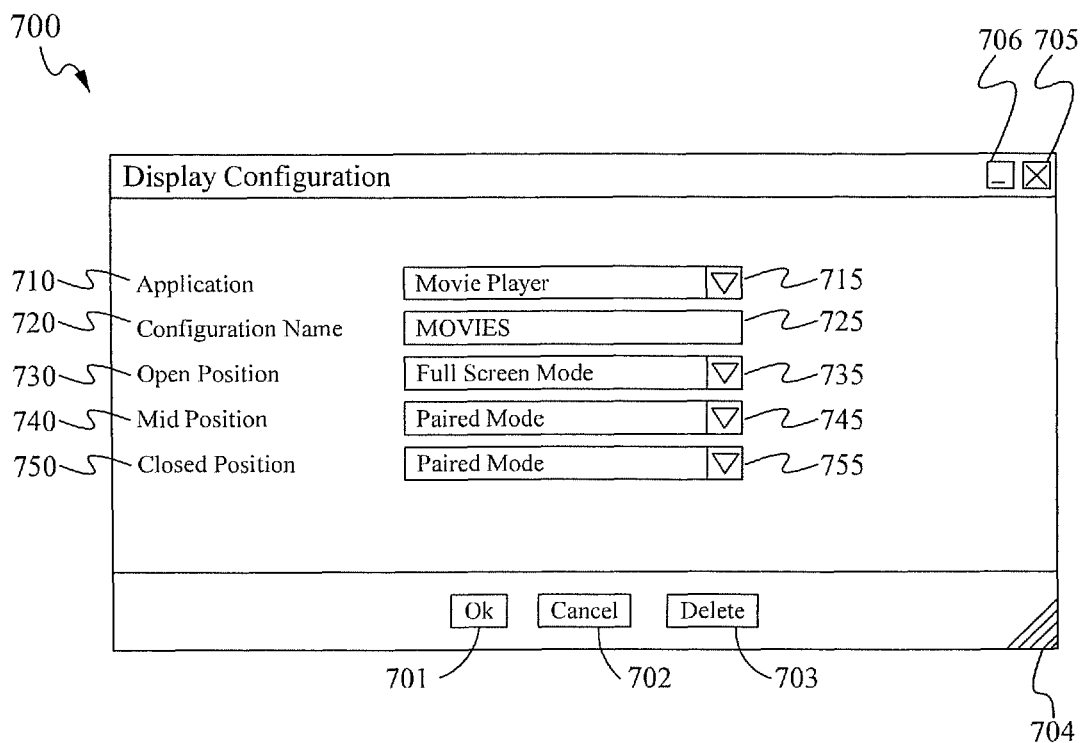

FIG. 7B shows an example configuration for a movie player application. The user selects the movie player application from the drop-down list 715 and enters a name for the configuration, "Movies", in field 725. The user has selected "Full Screen Mode" from the drop-down list 735 for use when the electronic device 100 is in the open position. The user has selected "Paired Mode" for use in the Mid Position 745 and the Closed position 755. Thus, in the closed position, and the mid position, a movie is played on both the first touchscreen display 115 and the second display 125. When the user opens the electronic device 100 to the open position, the movie is automatically played in Full Screen Mode. If the user folds the electronic device 100, taking it out of the open position, the display mode is automatically changed to Paired Mode as shown in fields 745 and 755.

Figure 7C:
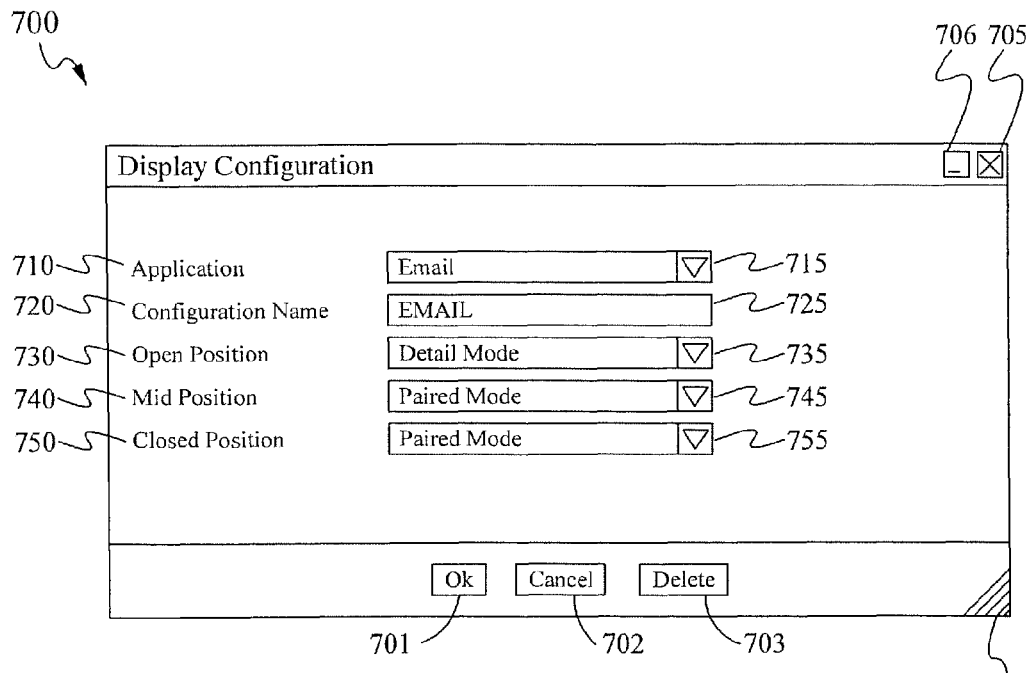

FIG. 7C shows an example configuration for an email application. The user selects the email application from the drop-down list 715, and enters a name describing the configuration in 725, "Email". The user has selected "Detail Mode" from the drop-down list 735 to be used when the electronic device 100 is in the open position. The user has selected Paired Mode for use in the mid position from the drop-down list 745 and Paired Mode for use in the closed position from the drop-down list 755. When the electronic device 100 is in the open position, the email inbox, or other selected folder, will be shown in the first touchscreen display 115. If the user selects a message for display, the message detail is displayed on the second display 125. If the user then closes the electronic device 100, the display mode is automatically set to Paired Mode and the inbox is displayed on both displays 115 and 125. If the second display is a touchscreen display, then the application can receive input from either touchscreen, the application will generate second display information from the input, and the second display information will be displayed on both displays 115 and 125 when in Paired Mode. In Detail Mode, if the input was received on the first touchscreen display 115, then the detail information will be on the second display 125; otherwise the detail information will be displayed on the first touchscreen display 115.

Figure 7D:
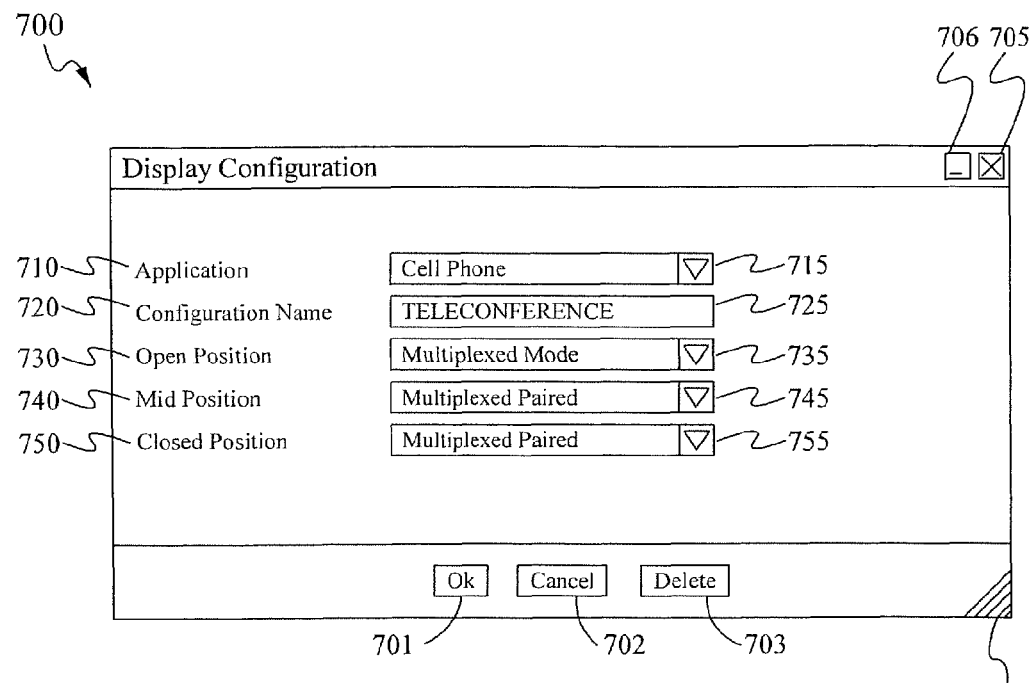

FIG. 7D shows an example configuration for a cell phone teleconference application. The user selects the cell phone application from the drop-down list 715 and enters a name describing the configuration in field 725, "Teleconference". The user has selected Multiplexed Mode for use in the open position using the drop-down list 735. In multiplexed mode, the teleconference data stream coming to the electronic device 100 comprises multiple video streams and can comprise multiple audio streams. The application demultiplexes the video streams and displays a first video stream on the first touchscreen display 115 and a second video stream on the second display 125. The user has selected Multiplex Paired mode for the mid position and the closed position. In Multiplexed Paired Mode, the video streams are displayed in a side-by-side with the first video stream displayed on the first touchscreen display 115 and the second video stream displayed on the second display 125.

Figure 7E:
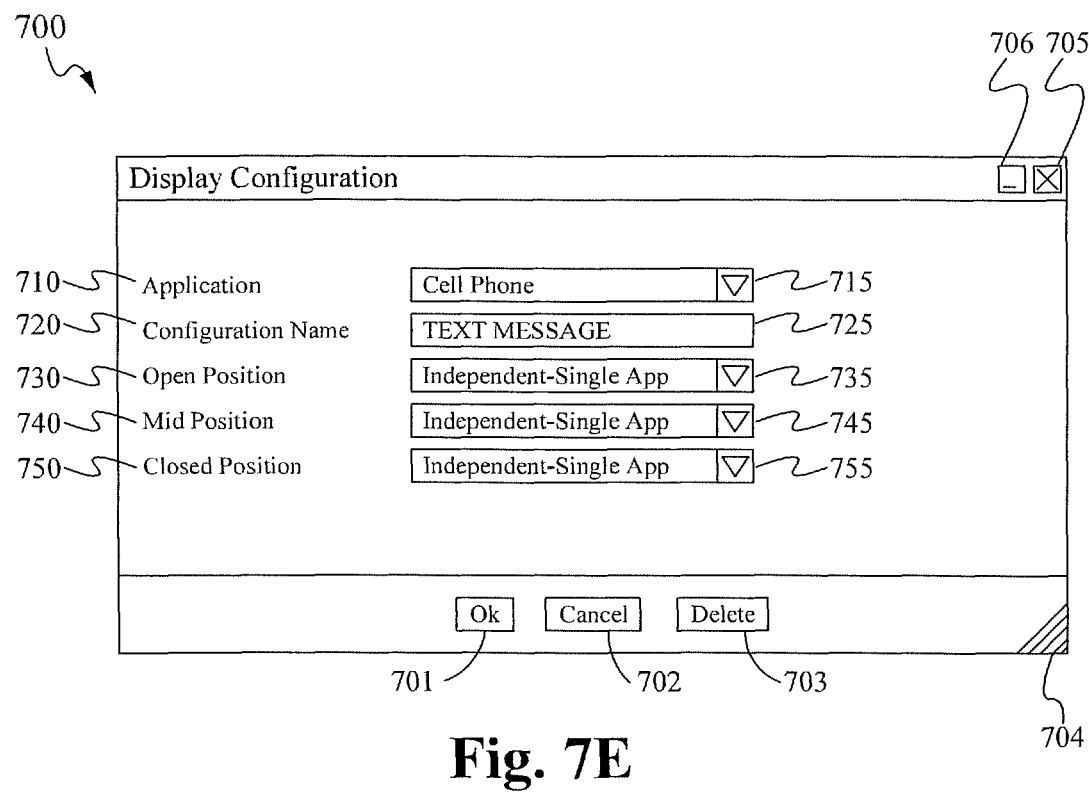

FIG. 7E shows an example configuration for a cell phone application that can be used for text messaging. The user selects the cell phone application from the drop-down list of applications 715, and enters a name for the configuration, "Text messages" in field 725. In the open, mid, and closed positions, the user has selected "Independent Single Application" in all positions.

The example configurations shown above, in FIGS. 7A-7E, are only a few of many possible configurations, and represent one way that a person of skill in the art can implement the methods of displaying information on an electronic device having two displays, as disclosed herein.

In operation, a method of displaying information on an electronic device comprising a first touchscreen display and a second display begins with an application on the electronic device having display information to be displayed on the electronic device. In a preferred embodiment, the displays are substantially the same size and resolution, and each is a touchscreen display. In a preferred embodiment, the application displays substantially all of the display information on both of the displays, such that the displays appear to duplicate one another. The application can split the display information and allocate substantially half of the display information to each display, thereby making the combination of the two displays appear as one larger display. The two displays can also be used by an application as two distinct touchscreen input and display devices. In a multitasking environment, each display can be dedicated to a distinct application, or a second instance of the same application.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made to the embodiments chosen for illustration without departing from the spirit and scope of the invention as defined by the appended claims.

What is claimed is:

1. A method of displaying information on an electronic device comprising a first touchscreen display on a first device portion of the electronic device, a wireless communications module, and a second touchscreen display on a second device portion of the electronic device, the method comprising the steps:
   providing a plurality of operating modes;
   when the electronic device is operating in a multiplexed mode, performing a first procedure including:
      demultiplexing an incoming multiplexed stream of the first video and the second video that is received as a phone call;
      displaying the first video on the first touchscreen display;
      displaying the second video on the second touchscreen display;
      multiplexing first video data from a first camera on the first device portion of the electronic device and second video data from a second camera on the second device portion of the electronic device into an outgoing multiplexed stream; and
   when the electronic device is operating in a detailed mode, performing a second procedure including:
      displaying data on the first touchscreen display;
      displaying the data on the second touchscreen display such that the data is concurrently displayed on both the first touchscreen display and the second touchscreen display;
      receiving user input on the first touchscreen display to manipulate the displayed data;
      while receiving the user input on the first touchscreen display, displaying the manipulated data on the second touchscreen display but not on first touchscreen display; and
      after the user input on the first touchscreen is completed, displaying the manipulated data on the first touchscreen display such that the manipulated data is concurrently displayed on both the first touchscreen display and the second touchscreen display.

2. The method of claim 1, wherein the stream comprises a video stream from a pair of conference call video cameras.

3. The method of claim 1, wherein the stream comprises a video stream from a pair of security cameras.

4. A control circuit implementing the method of claim 1.

5. The control circuit of claim 4, further comprising a video stream input interface.

6. The control circuit of claim 4, further comprising:
   a first touchscreen interface; and
   a second touchscreen interface.

7. The method of claim 1, further comprising positioning the electronic device in a closed position, wherein in the closed position, the first device portion and the second device portion are back-to-back such that the first touchscreen display and the second touchscreen display face outward.

8. The method of claim 1, further comprising physically separating the first device portion and the second device portion.

9. A method of displaying content on an electronic device, the electronic device comprising a first touchscreen display on a first device portion of the electronic device and a second touchscreen display on a second device portion of the electronic device, wherein the first device portion and the second device are detachably coupled, the method comprising the steps:
   concurrently displaying a first view of the content on each of the first touchscreen display and the second touchscreen display;
   receiving a user input on the first touchscreen display, wherein the user input received on the first touchscreen display is distinguished from user inputs received on the second touchscreen display and is associated with a visual manipulation of the first view of the content;
   automatically generating a second view of the content in response to the user input received on the first touchscreen display, wherein the second view of the content is a different view of the content than the first view of the content;

displaying the second view of the content on the second touchscreen display while the first view of the content is concurrently being displayed on the first touchscreen display;

receiving a user input on the second touchscreen display, wherein the user input received on the second touchscreen display is an input to expand the size of a selected picture;

automatically generating a display information in response to the user input received on the second touchscreen display; and displaying the display information on the first touchscreen display, wherein the display information is an expanded version of the selected picture according to the user input received on the second touchscreen display, wherein during the user input on the second touchscreen display, displaying on the first touchscreen an outline of a frame indicating the amount of expansion of the size of the selected picture, and the display information is displayed on the first touchscreen display without the outline of the frame after the user input on the second touchscreen display is completed.

10. A control circuit implementing the method of claim 9.

11. The control circuit of claim 10, further comprising:
a first touchscreen display interface; and
a second touchscreen display interface.

12. The method of claim 9, further comprising displaying the second view of the content on the first touchscreen display after the second view of the content is displayed on the second touchscreen display.

13. The method of claim 9, wherein the first view of the content displayed on the first touchscreen display is an inbox of an email application, wherein the user input received on the first touchscreen display is a selection of an email message to view, and wherein the second view of the content displayed on the second touchscreen display is the inbox of the email application with a portion of the inbox corresponding to the selected email message visually distinguished from the rest of the inbox to indicate the selection, and further comprising displaying a detailed view of the selected message on the second touchscreen display after the second view of the content is displayed in the second touchscreen display.

14. The method of claim 13, further comprising displaying the detailed view of the selected message on the first touchscreen display after the detailed view of the selected message is displayed on the second touchscreen display.

15. The method of claim 9, wherein the first view of the content displayed on the first touchscreen display is a directory displaying information representing a plurality of pictures, wherein the user input received on the first touchscreen display is a selection of one of the pictures for display, and further comprising displaying the selected picture on the second touchscreen display.

16. A method of displaying content on an electronic device, the electronic device comprising a first touchscreen display on a first device portion of the electronic device and a second touchscreen display on a second device portion of the electronic device, wherein the first device portion and the second device are detachably coupled, the method comprising the steps:

concurrently displaying a first view of the content on each of the first touchscreen display and the second touchscreen display;

receiving a user input on the first touchscreen display, wherein the user input received on the first touchscreen display is distinguished from user inputs received on the second touchscreen display and is associated with a visual manipulation of the first view of the content;

automatically generating a second view of the content in response to the user input received on the first touchscreen display, wherein the second view of the content is a different view of the content than the first view of the content;

when the user input on the first touchscreen display is being received, displaying the second view of the content only on the second touchscreen display while concurrently displaying the first view of the content only on the first touchscreen display; and when the user input on the first touchscreen display is completed, displaying the second view of the content on the first touchscreen display after the second.

* * * * *